USO10275436B2

United States Patent
Everitt et al.

(10) Patent No.: US 10,275,436 B2
(45) Date of Patent: Apr. 30, 2019

(54) ZOOM ENHANCEMENTS TO FACILITATE THE USE OF TOUCH SCREEN DEVICES

(71) Applicant: Apple Inc., Cupertino, CA (US)

(72) Inventors: Aaron M. Everitt, Cupertino, CA (US); Christopher Brian Fleizach, Morgan Hill, CA (US); Darren C. Minifie, San Jose, CA (US); Elizabeth Caroline Furches Cranfill, San Francisco, CA (US); Eric T. Seymour, San Jose, CA (US); Gregory F. Hughes, San Jose, CA (US)

(73) Assignee: Apple Inc., Cupertino, CA (US)

( * ) Notice: Subject to any disclaimer, the term of this patent is extended or adjusted under 35 U.S.C. 154(b) by 471 days.

(21) Appl. No.: 14/857,750

(22) Filed: Sep. 17, 2015

(65) Prior Publication Data

US 2016/0349970 A1 Dec. 1, 2016

Related U.S. Application Data

(60) Provisional application No. 62/169,493, filed on Jun. 1, 2015.

(51) Int. Cl.
| | |
|---|---|
| *G06T 3/40* | (2006.01) |
| *G06F 17/21* | (2006.01) |
| *G06F 17/24* | (2006.01) |
| *G06F 3/0485* | (2013.01) |
| *G06F 3/0488* | (2013.01) |

(52) U.S. Cl.
CPC .......... *G06F 17/24* (2013.01); *G06F 3/04883* (2013.01); *G06F 3/04886* (2013.01); *G06F 17/212* (2013.01); *G06T 3/40* (2013.01); *G06F 3/0485* (2013.01); *G06F 2203/04803* (2013.01); *G06F 2203/04805* (2013.01); *G06F 2203/04806* (2013.01)

(58) Field of Classification Search
CPC ................... G06F 17/24; G06F 2203/04805
See application file for complete search history.

(56) References Cited

U.S. PATENT DOCUMENTS

| | | | |
|---|---|---|---|
| 9,632,695 B2* | 4/2017 | Kocienda | ............ G06F 3/04886 |
| 9,678,646 B2* | 6/2017 | Joe | ...................... G06F 3/04845 |

(Continued)

*Primary Examiner* — William L Bashore
*Assistant Examiner* — Nathan K Shrewsbury
(74) *Attorney, Agent, or Firm* — Fernando & Partners, LLP; Jacob A. Smith

(57) ABSTRACT

An electronic device with a display showing a user interface (UI) automatically adjusts the zoom level of a magnification region. The electronic device receives a request to magnify at least a portion of the display showing the UI. The electronic device determines the context that the electronic device was operating in at the time of the magnification request. The context is comprised of display parameters, environmental parameters, or both. The electronic device displays the UI at a zoom level determined based on user preferences. Upon detecting a text input condition, the device resizes and optionally moves the magnification region so that the resized magnification region does not overlap with the newly displayed composition interface window. The device uses an auto-snap feature when the content within the magnification region displays a second boundary upon scrolling the content within the magnification region from a first boundary opposite the second one.

20 Claims, 33 Drawing Sheets

(56) References Cited

U.S. PATENT DOCUMENTS

| | | | |
|---|---|---|---|
| 9,706,106 B2* | 7/2017 | Kang | G06F 3/04845 |
| 2006/0033724 A1* | 2/2006 | Chaudhri | G06F 3/0482 |
| | | | 345/173 |
| 2007/0033543 A1* | 2/2007 | Ngari | G06F 3/0481 |
| | | | 715/788 |
| 2007/0150829 A1 | 6/2007 | Eschbach et al. | |
| 2008/0165142 A1* | 7/2008 | Kocienda | G06F 3/04886 |
| | | | 345/173 |
| 2008/0180408 A1* | 7/2008 | Forstall | G06F 3/0482 |
| | | | 345/177 |
| 2008/0189650 A1* | 8/2008 | Scott | G06F 3/0485 |
| | | | 715/784 |
| 2009/0225041 A1* | 9/2009 | Kida | G06F 3/0237 |
| | | | 345/173 |
| 2009/0251422 A1* | 10/2009 | Wu | G06F 3/04886 |
| | | | 345/173 |
| 2010/0141590 A1* | 6/2010 | Markiewicz | G06F 3/0488 |
| | | | 345/173 |
| 2010/0164959 A1* | 7/2010 | Brown | G06F 3/04886 |
| | | | 345/473 |
| 2010/0231612 A1* | 9/2010 | Chaudhri | G06F 3/04886 |
| | | | 345/684 |
| 2010/0235736 A1* | 9/2010 | Fleisher | G06F 3/0481 |
| | | | 715/702 |
| 2010/0283800 A1* | 11/2010 | Cragun | G06F 3/0481 |
| | | | 345/661 |
| 2011/0072390 A1* | 3/2011 | Duga | G06F 3/0481 |
| | | | 715/800 |
| 2011/0074698 A1* | 3/2011 | Rapp | G06F 3/0481 |
| | | | 345/173 |
| 2011/0154246 A1* | 6/2011 | Oh | G06F 3/04886 |
| | | | 715/773 |
| 2011/0199393 A1* | 8/2011 | Nurse | A43B 3/00 |
| | | | 345/665 |
| 2012/0038675 A1* | 2/2012 | Johnson | G06F 1/1686 |
| | | | 345/660 |
| 2012/0105486 A1* | 5/2012 | Lankford | G06F 3/013 |
| | | | 345/661 |
| 2012/0117506 A1* | 5/2012 | Koch | G06F 3/04886 |
| | | | 715/773 |
| 2012/0306772 A1* | 12/2012 | Tan | G06F 3/0488 |
| | | | 345/173 |
| 2012/0316776 A1* | 12/2012 | Brown | G01C 21/3664 |
| | | | 701/428 |
| 2013/0239031 A1* | 9/2013 | Ubillos | H04L 51/24 |
| | | | 715/765 |
| 2013/0293490 A1* | 11/2013 | Ward | G06F 3/0488 |
| | | | 345/173 |
| 2014/0049499 A1* | 2/2014 | Huck | G06F 3/0416 |
| | | | 345/173 |
| 2014/0121524 A1* | 5/2014 | Chiang | A61B 8/463 |
| | | | 600/459 |
| 2014/0267438 A1 | 9/2014 | Sosinski | |
| 2015/0026176 A1* | 1/2015 | Bullock | G06F 17/3064 |
| | | | 707/736 |
| 2015/0268766 A1* | 9/2015 | Kim | G06F 3/044 |
| | | | 345/174 |
| 2015/0286378 A1* | 10/2015 | Joe | G06F 3/04845 |
| | | | 345/663 |
| 2015/0287043 A1* | 10/2015 | Michaelis | G06Q 10/063 |
| | | | 705/317 |
| 2015/0309693 A1* | 10/2015 | Li | G06F 3/04812 |
| | | | 715/711 |
| 2016/0259491 A1* | 9/2016 | Jacobs | G06F 9/4443 |

* cited by examiner

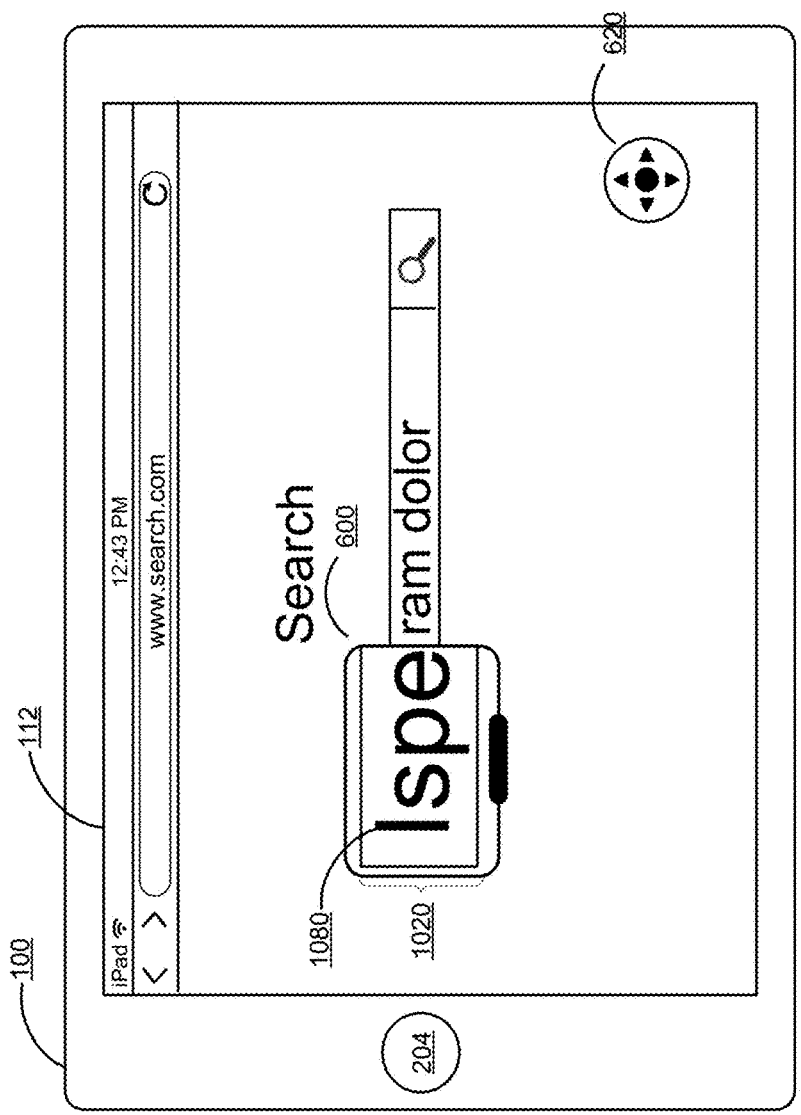

ZOOM ENHANCEMENTS TO FACILITATE THE USE OF TOUCH SCREEN DEVICES

RELATED APPLICATIONS

This application claims the benefit of U.S. Provisional Application No. 62/169,493, filed Jun. 1, 2015, which is incorporated by reference in its entirety.

FIELD OF TECHNOLOGY

The embodiments herein generally relate to electronic devices with displays and displays in general. More particularly, the embodiments relate to user interfaces magnified to various zoom levels on the display to allow for greater accessibility to the device for low-vision users.

BACKGROUND

As electronic devices frequently display small text or images it is challenging to make electronic devices accessible to low-vision users. The screen of an electronic device is often too small to increase the size of text, pictures, or user interface (UI) elements on the display making reading or viewing of content difficult for low-vision users. For example, some users may be able to use a UI as it is normally displayed but may have trouble reading text of an electronic book or online article. As a result, zoom or magnification methods have been used to enhance low-vision user experience. However, zoom methods on portable electronic devices frequently require multiple adjustments to reach the appropriate zoom level for a user and may also require multiple inputs to activate the zoom feature. Thus, using portable electronic devices has remained a frustration to low-vision users despite attempts to improve the experience.

SUMMARY

An electronic device displays a user interface for executing applications on the device and interacting with applications. While displaying the user interface, the device receives a request to magnify at least a portion of the user interface. In response to the request to magnify the user interface, the device determines a context that the device was operating in at the time of the request. In some embodiments, the context includes display parameters, environmental parameters, or is determined relative to the currently displayed application of the device. The device then determines a zoom level corresponding to the determined context. In some embodiments, the corresponding zoom level is determined based on past manual magnification adjustments received by the device from the user and a calculation of a user's preferred zoom level at the determined context. In some embodiments, a display filter corresponding to the determined context may also be applied to the displayed user interface. After the device is displaying the user interface at the determined zoom level, the device may determine a change in the context. In response to a change in context the device determines a new zoom level corresponding to the new context and displays the user interface at the new zoom level.

An electronic device provides zoom enhancements to facilitate the use of the device's touch-sensitive display for low-vision users. The zoom enhancement includes a method that displays a magnification region on a first portion of the display's user interface, which is displayed at a first zoom level. The magnification region includes a subset of the first portion of the user interface and is displayed at a second zoom level that is higher than the first zoom level. While displaying the user interface, the device detects a text input condition. Upon detecting the text input condition, the device displays a composition interface window in a second portion of the display. The device also resizes the magnification region to a third portion of the display so that the resized magnification region does not overlap with the composition interface window.

The zoom enhancements also includes a method that displays a magnification region on a first portion of the user interface, which includes content that has a first boundary and a second boundary that is opposite the first boundary. The magnification region includes a subset of the first portion of the user interface, including the first boundary of the content, and is displayed at a second zoom level that is higher than the first zoom level. While displaying the user interface, the device detects a scroll request to scroll the content within the magnification region. Upon detecting the scroll request, the device scrolls the content within the magnification region in accordance with the scroll request so that the second boundary of the content is displayed within the magnification region. After scrolling the content in accordance with the scroll request, the device detects a predefined scroll event. Upon detecting the predefined scroll event, the device scrolls the content so that the first boundary of the content is displayed within the magnification region.

BRIEF DESCRIPTION OF DRAWINGS

For a better understanding of the various described embodiments, reference should be made to the Description of Embodiments below, in conjunction with the following drawings in which like reference numerals refer to corresponding parts throughout the figures.

FIGS. 10A-10F illustrates displaying a magnification region in a user interface with a composition interface window for entering text in a text input region of the user interface, according to some embodiments.

DETAILED DESCRIPTION

Exemplary Devices

Figure 1A:
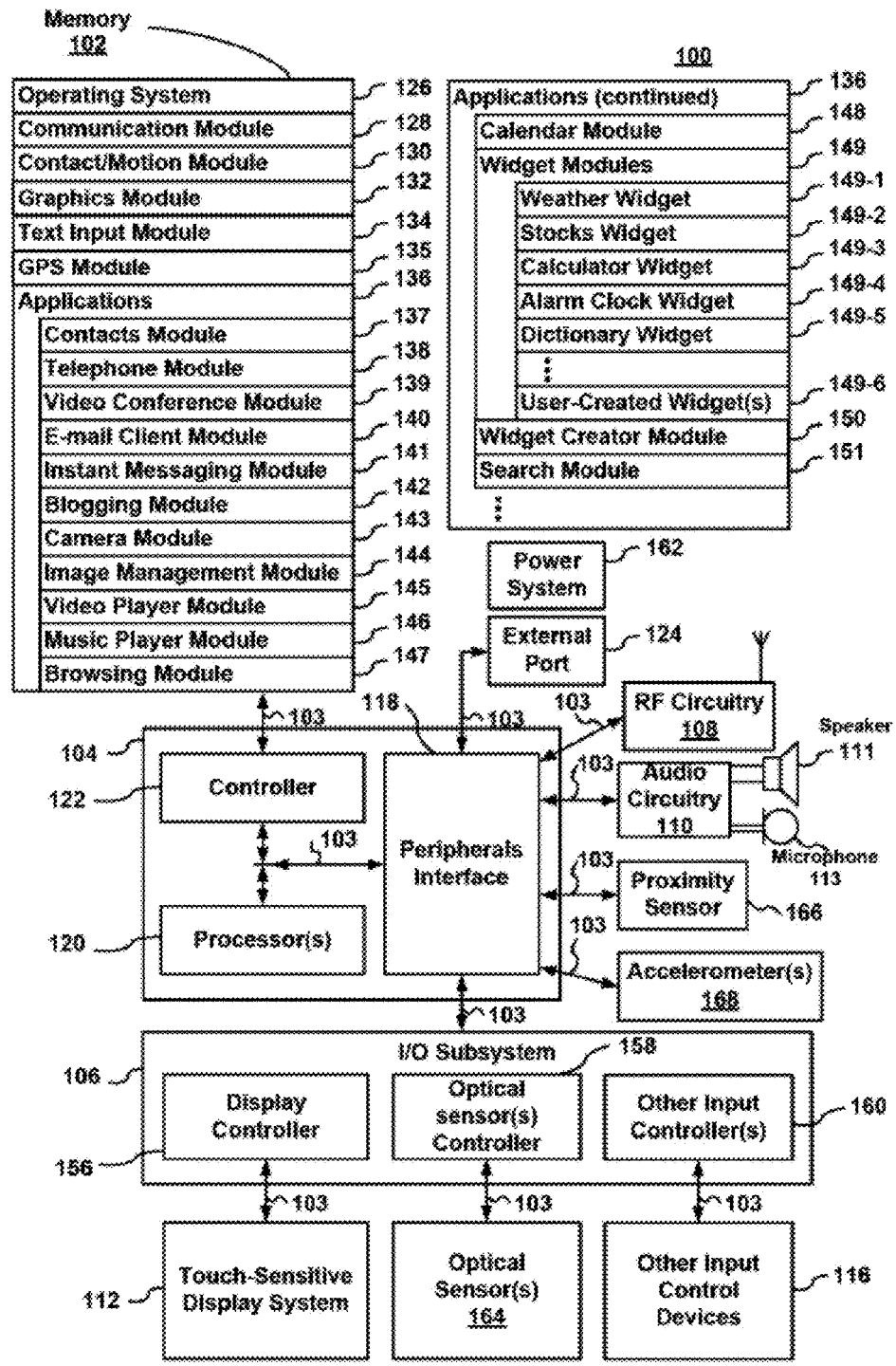
FIG. 1A is a block diagram illustrating a portable multifunction device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments optionally are practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In some embodiments, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in some embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In some embodiments, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise thanstylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
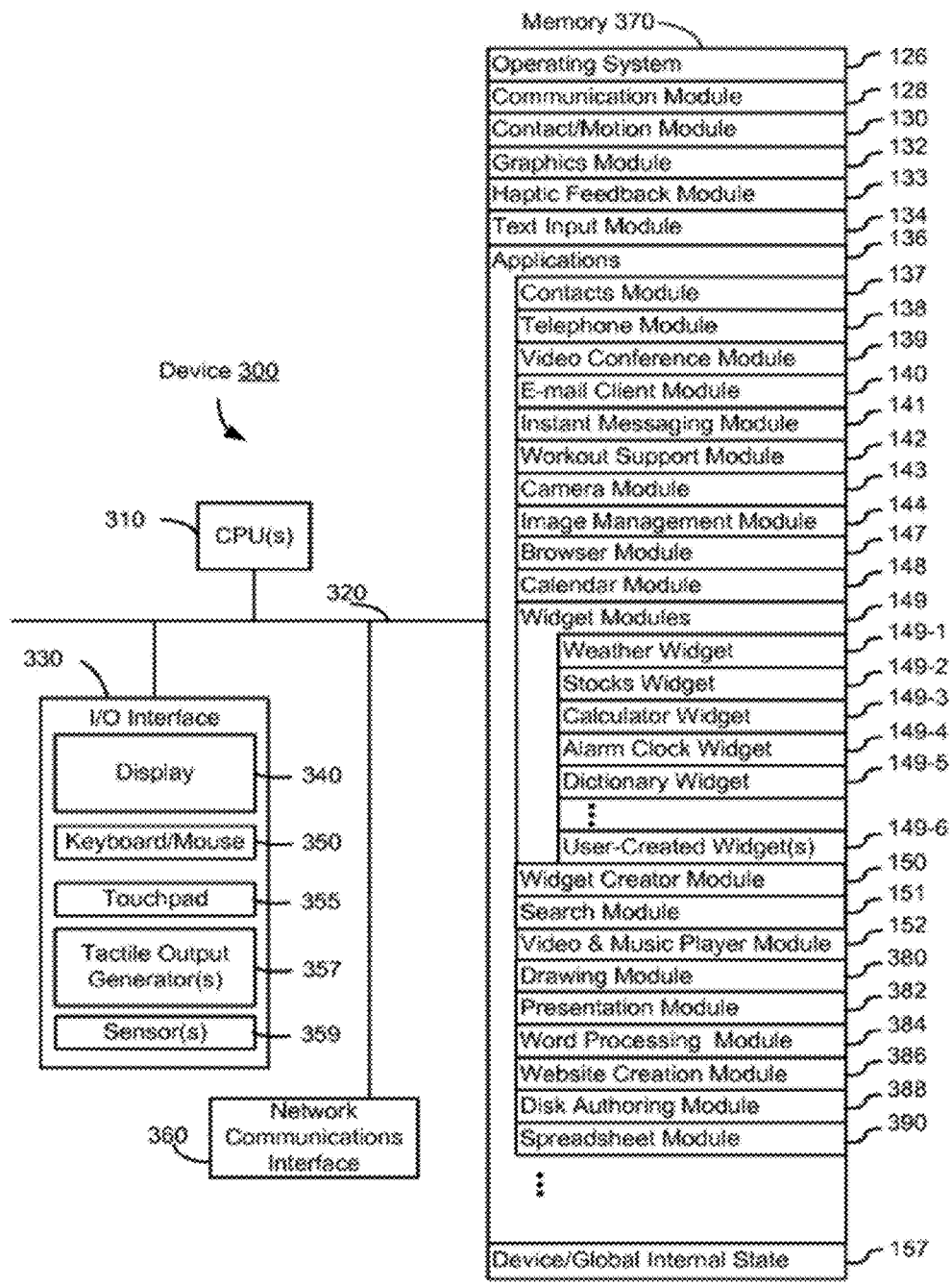
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
 contacts module 137 (sometimes called an address book or contact list);
 telephone module 138;
 video conferencing module 139;
 e-mail or email client module 140;
 instant messaging (IM) module 141;
 workout support module 142;
 camera module 143 for still and/or video images;
 image management module 144;
 browser module 147;
 calendar module 148;
 widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
 widget creator module 150 for making user-created widgets 149-6;
 search module 151;
 video and music player module 152, which is, optionally, made up of a video player module and a music player module;
 notes module 153;
 map module 154; and/or
 online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), email address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in some embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In some embodiments, a "menu button" is implemented using a touchpad. In some embodiments, the menu button is a physical push button or other physical input control device instead of a touchpad.

Figure 1B:
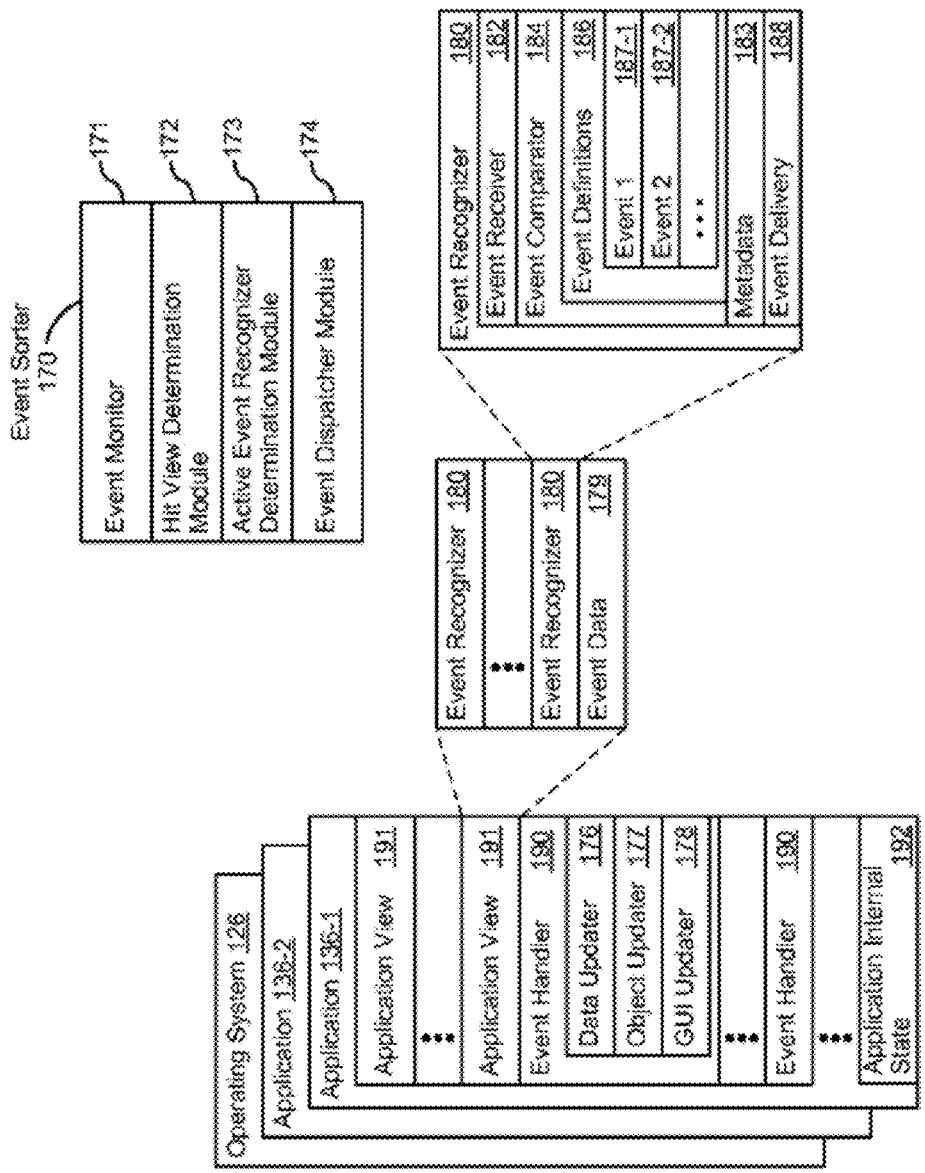
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In some embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In some embodiments, active event recognizer determination module 173 determines that all views that include the physical location of a sub-event are actively involved views, and therefore determines that all actively involved views should receive a particular sequence of sub-events. In some embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In some embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In some embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In some embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In some embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
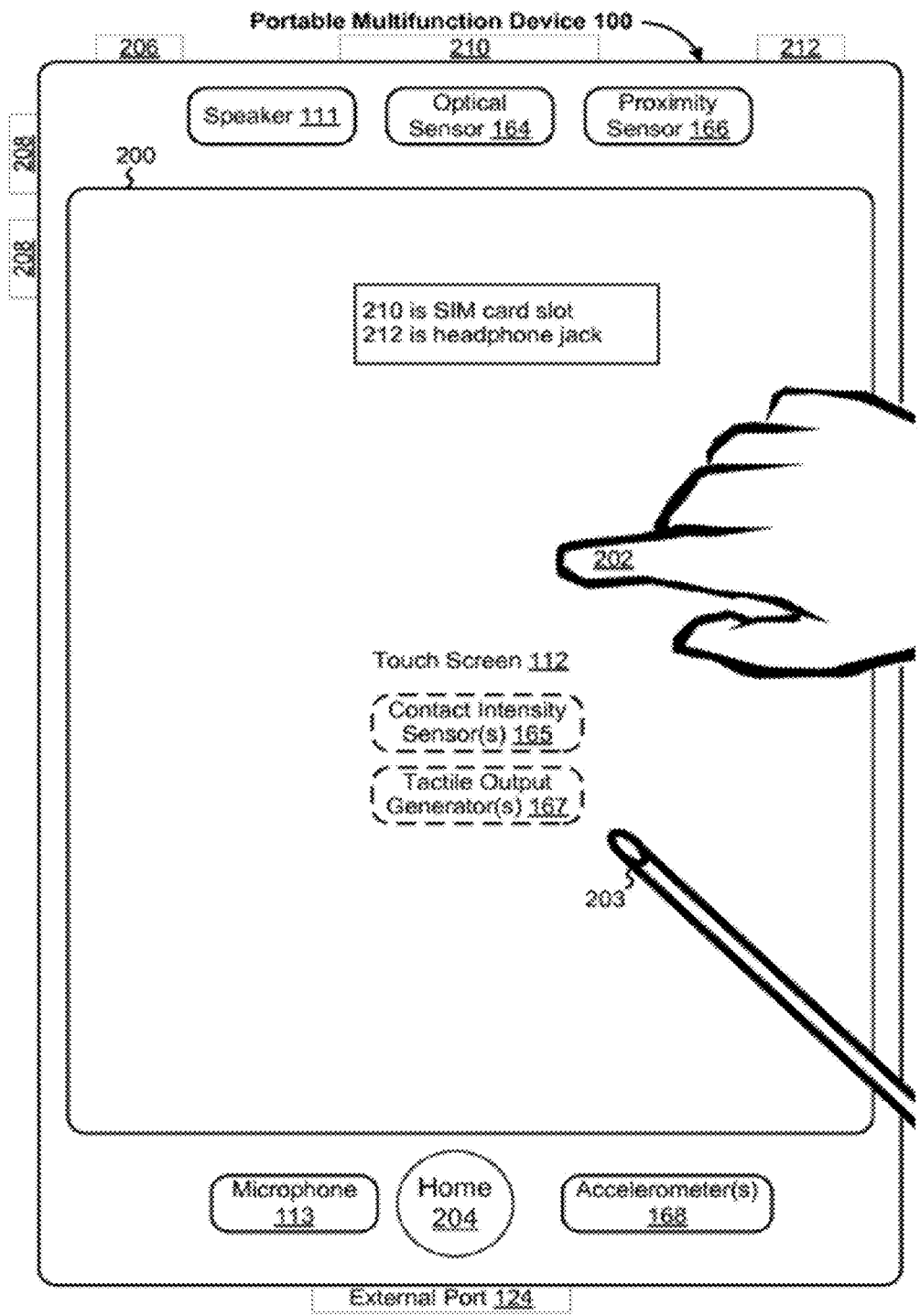
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In some embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. In some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in some embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
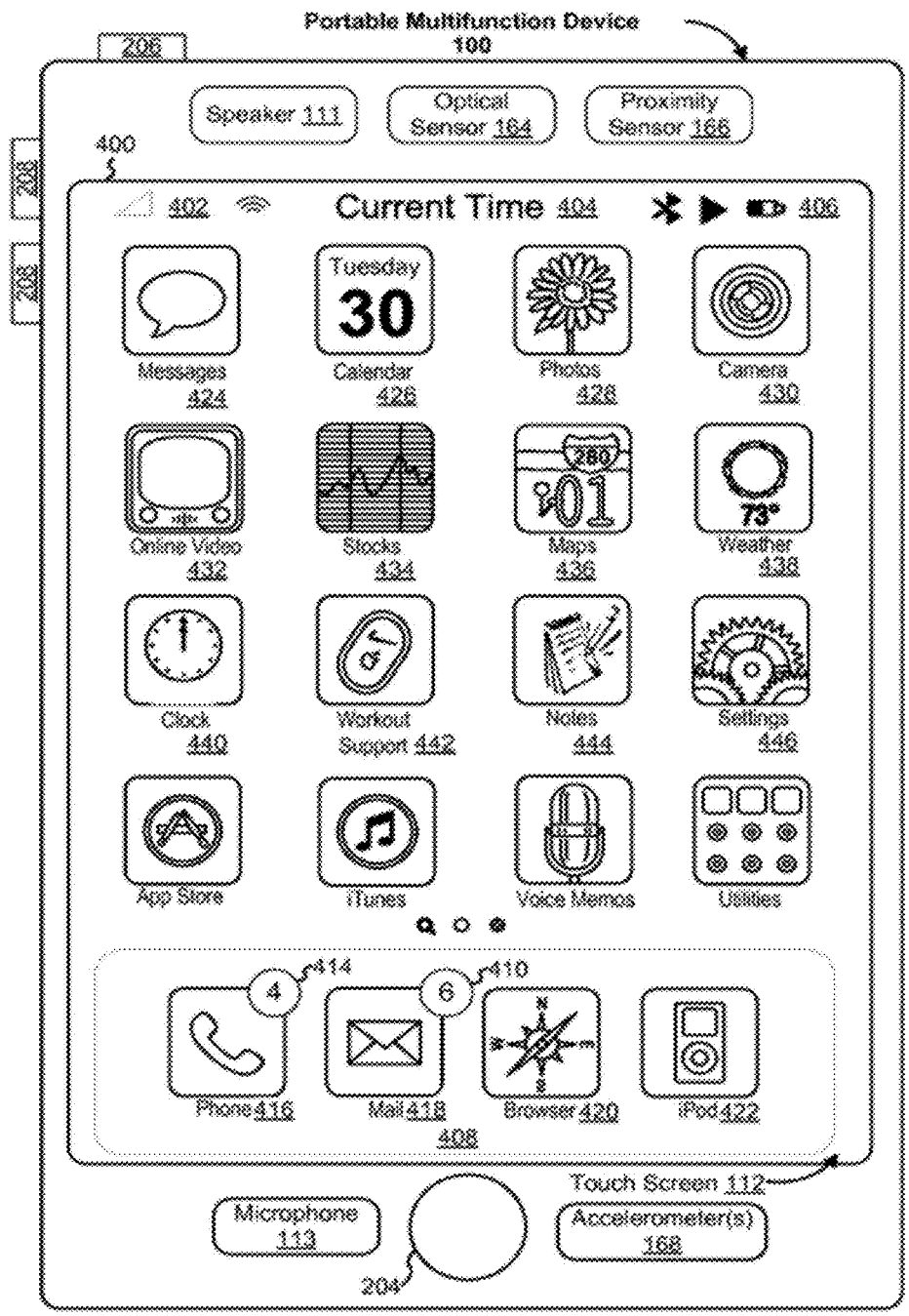
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
- Icon 416 for telephone module 138, labeled "Phone," which optionally includes an indicator 414 of the number of missed calls or voicemail messages;
- Icon 418 for email client module 140, labeled "Mail," which optionally includes an indicator 410 of the number of unread e-mails;
- Icon 420 for browser module 147, labeled "Browser"; and
- Icon 422 for video and music player module 152, also referred to as iPod (trademark of Apple Inc.) module 152, labeled "iPod"; and Icons for other applications, such as:
- Icon 424 for IM module 141, labeled "Text";
- Icon 426 for calendar module 148, labeled "Calendar";
- Icon 428 for image management module 144, labeled "Photos";
- Icon 430 for camera module 143, labeled "Camera";
- Icon 432 for online video module 155, labeled "Online Video";
- Icon 434 for stocks widget 149-2, labeled "Stocks";
- Icon 436 for map module 154, labeled "Map";
- Icon 438 for weather widget 149-1, labeled "Weather";
- Icon 440 for alarm clock widget 149-4, labeled "Clock";
- Icon 442 for workout support module 142, labeled "Workout Support";
- Icon 444 for notes module 153, labeled "Notes"; and
- Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
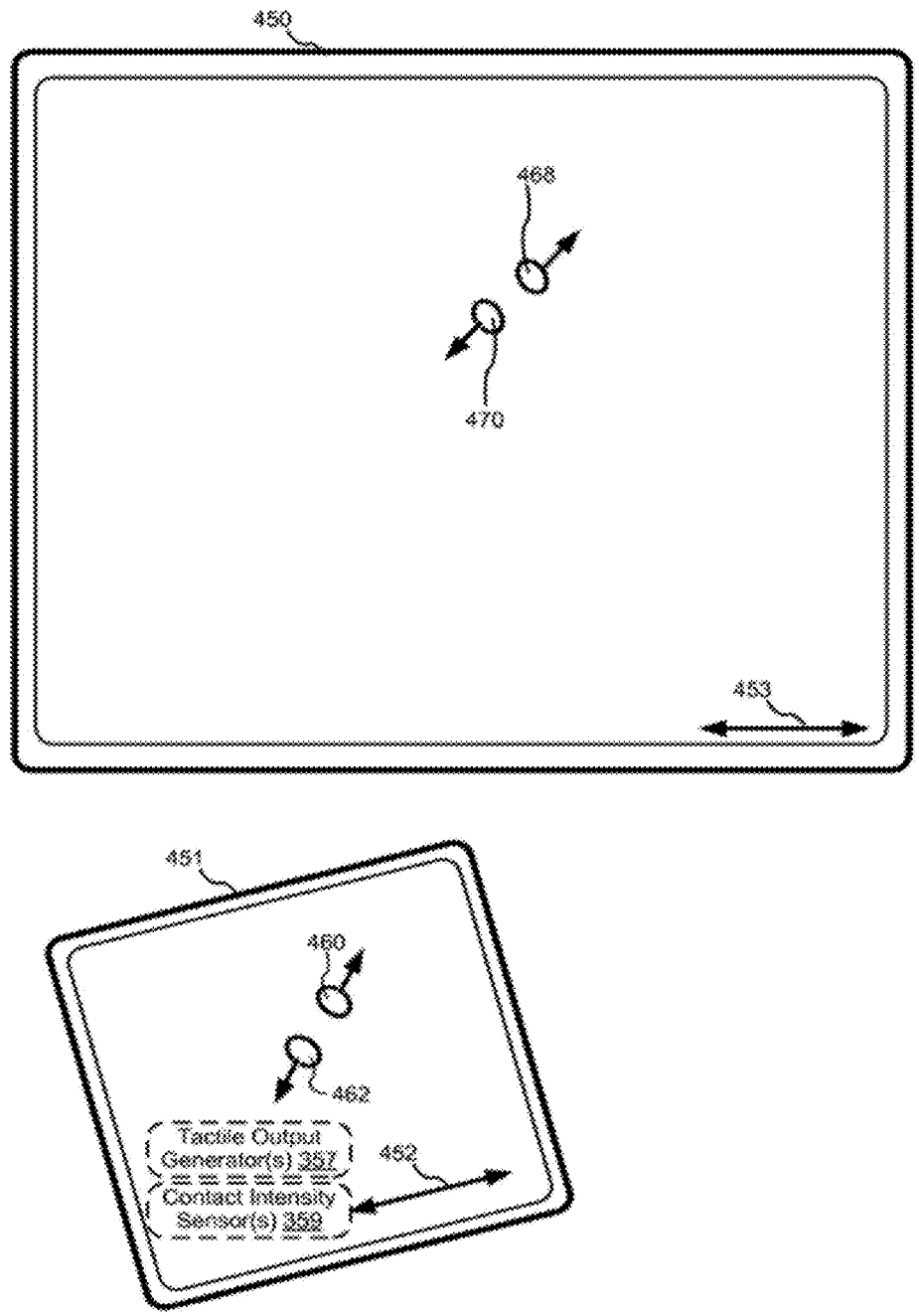
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357 for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with some embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

Attention is now directed towards embodiments of user interfaces ("UI") and associated processes that optionally are implemented on an electronic device with a display and a touch-sensitive surface, such as device 300 or portable multifunction device 100.

As mentioned previously, the device 100 includes multiple applications 136 configured to execute on the device 100. One of the multiple applications 136 is the email client module 140 and a user can interact with the application on the computing device 100. As will be further described below, the email client module 140 has various user interfaces to enhance the user experience with the computing device 100 when using the application.

Auto-Adjustment of Zoom Level Based on Context

Figure 5:
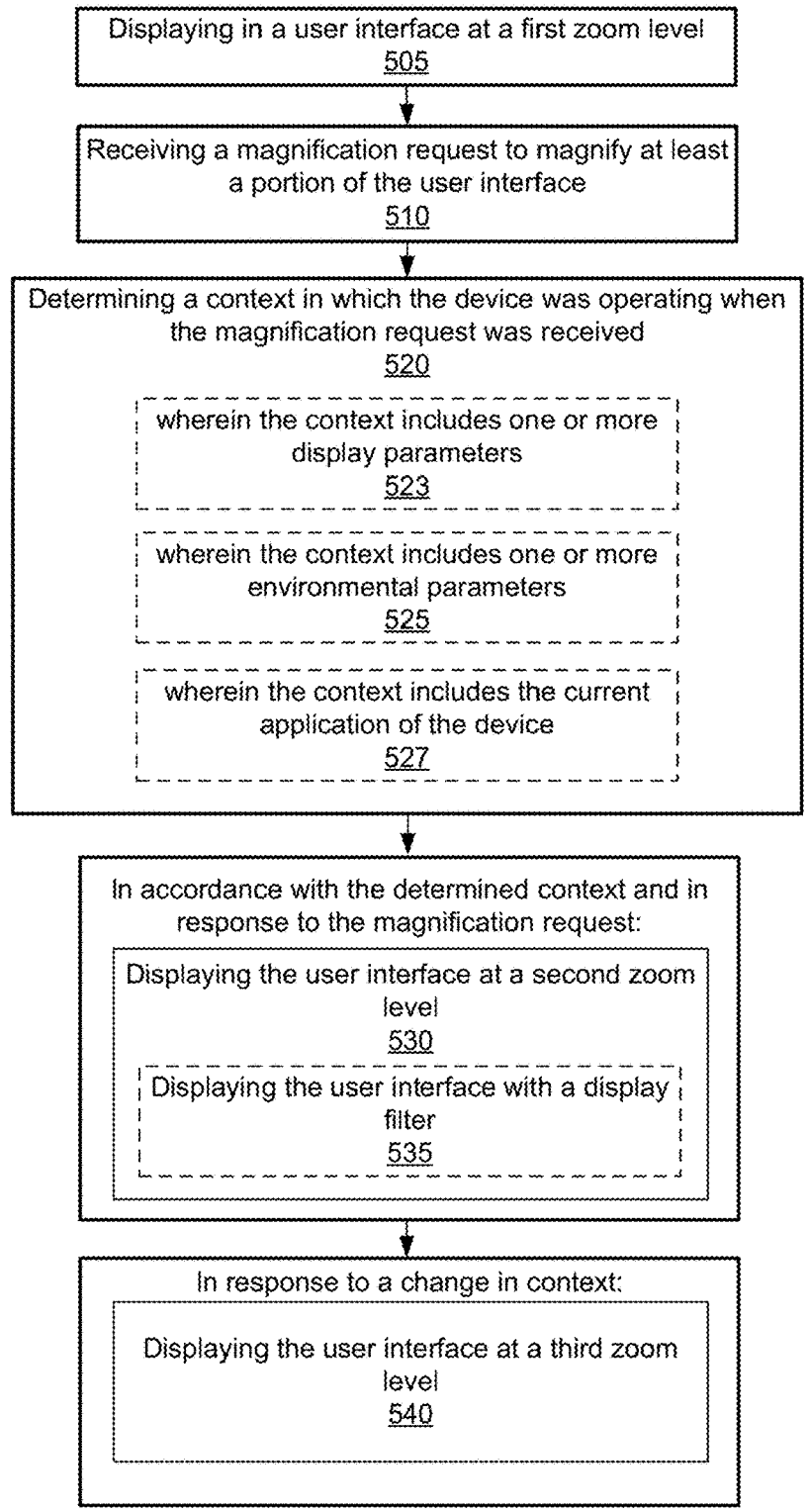
FIG. 5 is a flow diagram of a method of providing zoom level auto-adjustment by an electronic device in accordance with some embodiments.
Figure 6A:
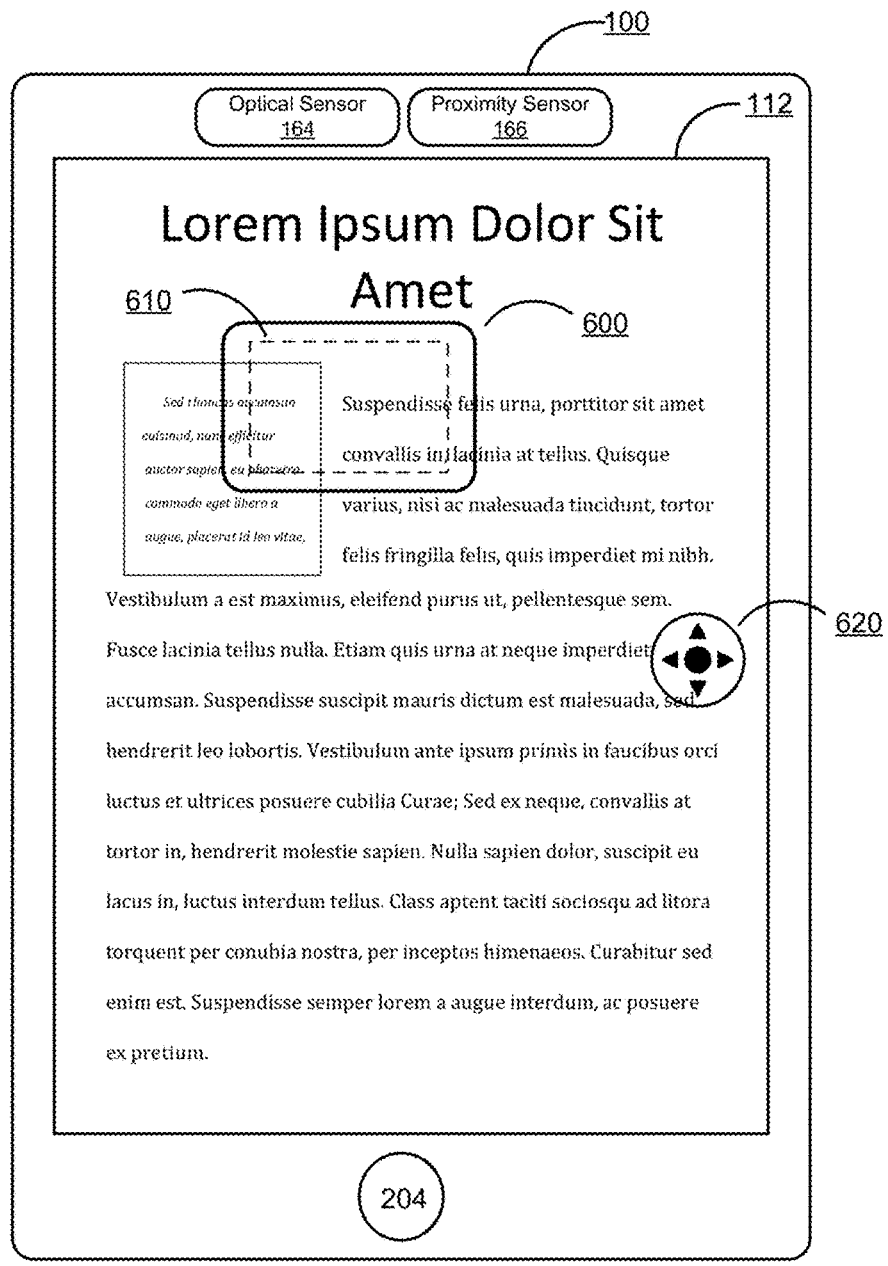
FIG. 6A illustrates an exemplary user interface where a portion of the user interface is occupied by a zoom region for displaying a magnification window and a magnification region of the user interface in addition to a directional pad for modifying the position of the magnification window and magnification region in accordance with some embodiments.

FIG. 5 is a flow diagram of a method of providing zoom level auto-adjustment by an electronic device in accordance with some embodiments. In some embodiments the method of FIG. 5 is executed by computer programming instructions contained in a graphics module 132 or in another module of device 100. The device 100 displays 500 a user interface of an application 136 installed on the device 100 on touchscreen 112. In some embodiments user interface displayed by the device 100 is generated as a result of any of the applications 146 installed on device 100. For example, FIG. 6A illustrates a user interface generated by a browser application module 147, a word processing application module 384, or any other application module 146 that could generate the user interface illustrated in FIG. 6A to be displayed on device 100. In some embodiments, the user interface contains text blocks, GUI elements, images, videos, or any other suitable media that are displayed by an application 146.

The device 100 receives 510 a magnification request from a user to magnify at least a portion of the display. The device 100 receives the magnification request in a number of different ways. In some embodiments, the magnification request receives a single or multiple finger gesture on a touchscreen 112 of device 100. In some embodiments, the magnification request is enabled by a user selectable setting. In some embodiments, the magnification is received through a combination of keyboard or mouse gestures.

The magnification request requests 510 that the device magnify the entire display of device 100. In some embodiments, the magnification request 510 requests that only a portion of the display of device 100 be magnified. In some embodiments this is implemented through the use of a zoom window as illustrated in FIG. 6B.

Figure 6B:
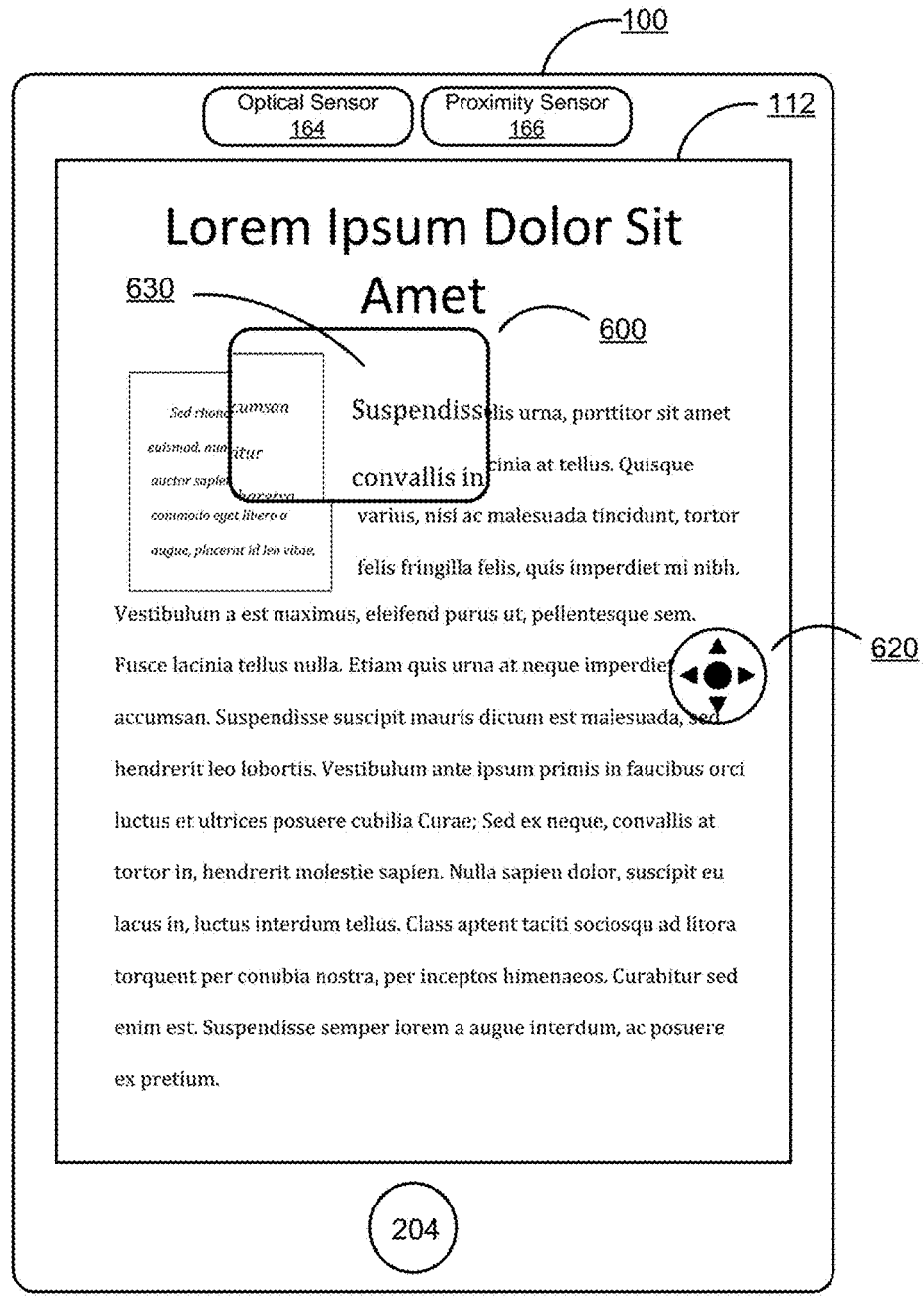
FIG. 6B illustrates the exemplary user interface where a portion of the user interface is occupied by the magnification window that is displaying a magnified portion of the user interface corresponding to the magnification region in accordance with some embodiments.

In some embodiments, the user interface displayed by device 100 includes a magnification window 600 that displays a magnified portion of the user interface that is located within a magnification region 610 as illustrated in FIG. 6B. In some embodiments, the magnification region 610 varies in size, in a way that is inversely proportional to the zoom level associated with the magnification window 600. For example, if the zoom level is increased by a factor the magnification region 610 decreases in size by the same factor while the size of the magnification window 600 remains the same. In some embodiments, the portion of the user interface inside the magnification region 610 is magnified the fill the entire magnification window 600. For example, FIG. 6C illustrates a magnified portion of the user interface 630 corresponding to magnification region 610 displayed inside the magnification window 600. In some embodiments, the magnification window 600, which displays the magnified portion of the user interface 630, is accompanied by an on-screen directional pad 620. In some embodiments, if touch screen 112 receives a touch gesture on one of the directional arrows of the directional pad 620 the device 100 moves the magnification window 600 and the corresponding magnification region 610 in the direction indicated by the directional arrows. In some embodiments, the magnification window 600 moves in response to a finger gesture on touchscreen 112 of device 100, or mouse or keyboard input. In some embodiments, magnifying the user interface, e.g., with a gesture within or outside the magnification window 600, results in proportional magnification of the content in magnification region. Thus, magnifying the user interface maintains the same zoom level. In some embodiments, when selecting an object, e.g., a hyperlink, "through" the magnification region 610 by receiving a gesture from a user at the on-screen location of the hyperlink within the magnification window 600, the device displays a new user interface with the magnification region 610 displayed at the same location with the same zoom level.

The device 100 determines 520 a context in which the device was operating when the magnification request was received. In some embodiments, the context of the device is based on the display features being displayed in the user interface of the application 146 displayed by device 100 that are relevant to the readability of the font and therefore is correlated with a higher or lower preferred zoom level of the user. In some embodiments, display features included in the context are relative to the location of the magnification region 610. In some embodiments, context based on the display features is comprised of multiple display parameters describing the display features. For example, in some embodiments the display feature of a text block is described by a font size and a line spacing parameter. In some embodiments, if display context is relative to the location of the magnification region 610, each distinct region of the user interface has distinct display parameter values. For example, if an interface is displaying an article and the title of the article is followed by the text of the article the font size parameter of the region containing the title has a value of 18 while the font size parameter of the region containing the text of the article has a font size parameter value of 12. In some embodiments, display parameters are determined for the whole display prior to a magnification request. In some embodiments, display parameters are determined in real time according to the location of the magnification region. Display parameters include a number of text related parameters including but not limited to a font size parameter, a font type parameter, a font color parameter, a font contrast parameter, a line spacing parameter. In some embodiments, if the interface contains an image, display parameters also include image related parameters including but not limited to an image resolution parameter, an image size parameter, an image level of detail parameter, or an image color parameter.

In some embodiments, a font size parameter is simply a numerical variable representing the font size of the font within a region of the displayed user interface or within the magnification region 610. In some embodiments, the font size of text in the user interface is determined by the device 100 using appropriate font identification methods or is reported by the application 146.

In some embodiments, a font type parameter is a categorical variable representing the font type or many variables representing different aspects of the font. For example, a font type variable has a value indicating that the font is "Times New Roman." This font data is reported by the application 146 or determined by the device 100 using appropriate font identification methods. In some embodiments, the font type parameter is composed of a number of descriptive variables indicating different aspects of the font. In some embodiments, the variables indicate a font's weight, slope, width, serif, or other characteristics and are numerical or categorical.

In some embodiments, a font color parameter is a numerical or categorical variable indicating the color of a font (e.g., a color value from 0 to 255 or yellow, red, green, etc.). In some embodiments, a font contrast parameter is a numerical variable indicating the contrast of the font color and the background of the user interface.

In some embodiments, a line spacing parameter is a numerical variable that indicates the spacing between lines of text within a region of the interface.

In some embodiments, an image resolution parameter is a numerical variable indicating the resolution of an image displayed in a user interface. In some embodiments, the resolution of the image is determined by the device 100 or reported by the application 146.

In some embodiments, an image size parameter is a numerical variable or a plurality of numerical variables indicating the area of an image or the dimensions of an image in a user interface. In some embodiments, the image size parameter is used in combination with the image resolution parameter to determine an appropriate zoom level for the image. For example, if an image is small with high resolution it is beneficial to use a relatively high zoom level since more detail is available in the image. On the other hand if the image is large and has a low resolution the image does not need to be magnified significantly.

In some embodiments, an image detail parameter is a numerical or categorical variable indicating the detail of an image in a user interface. In some embodiments, the image detail is determined using edge or line detection, noise detection, image energy maps, gradient maps, or any other suitable method. In some embodiments, a numerical score for each image map is calculated based of the image processing functions described above in order to create a detail parameter.

In some embodiments, an image color parameter is a single numerical or categorical variable or a plurality of variables representing an image's color balance, contrast, brightness, or any other suitable aspect.

Figure 7:
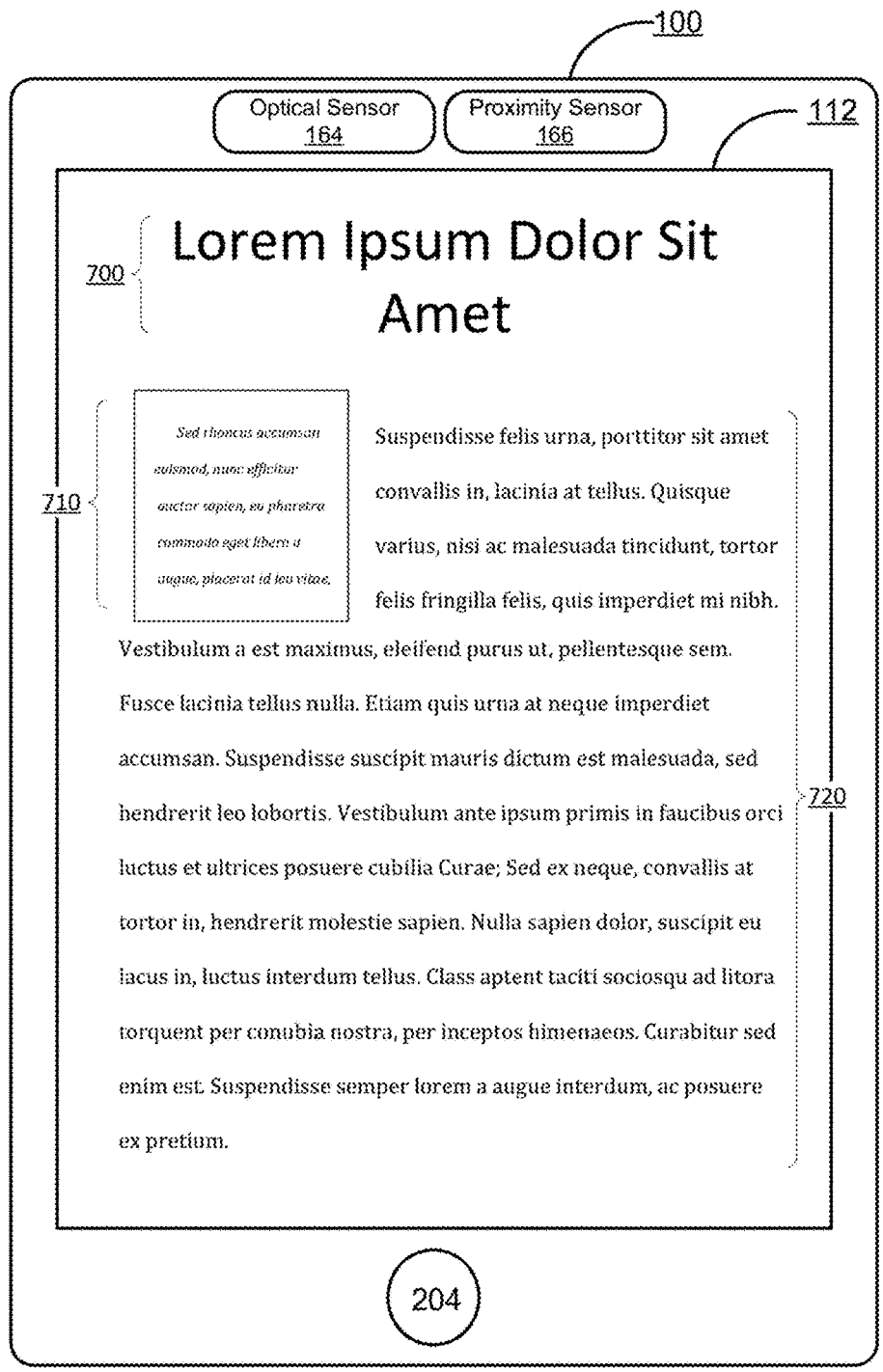
FIG. 7 illustrates an exemplary user interface indicating context regions of the user interface in accordance with some embodiments.

FIG. 7 shows the example user interface of FIG. 6 with the display features and the corresponding regions identified in accordance with some embodiments. Because there are no images in the example illustrated in FIG. 7 only text related parameters are discussed, however, in some embodiments image display parameters are distributed in the user interface in a similar way. Within region 700 the title of the article displayed in the user interface is displayed. In some embodiments, the region of the user interface corresponding to the title of the article has an associated font type parameter value of "Calibri Bold," a font size parameter value of 24, and a line spacing parameter value of 1, amongst other possible display parameters associated with the region. Region 710 has an associated font type parameter value of "Cambria Italic," a font size parameter value of 6, and a line spacing parameter value of 2, amongst other possible display parameters associated with the region. Region 720 has an associated font type parameter value of "Cambria," a font size parameter value of 9, and a line spacing parameter of 2. In some embodiments, parameter regions are determined through suitable text block identification means.

In addition to determining 520 context using display parameters, in some embodiments, the determined context is also comprised of environmental parameters. In some embodiments, environmental parameters include an ambient light parameter, a user proximity parameter, a screen brightness parameter, a screen resolution parameter, or a display size parameter.

In some embodiments, an ambient light parameter is a numerical variable corresponding to the ambient light received in an optical sensor 164 of the device 100. In some embodiments, a user proximity parameter is a numerical variable corresponding to the proximity of the user as identified by a proximity sensor 166 of the device 100. In some embodiments, a screen brightness parameter is a numerical variable indicating the current brightness setting of the screen of device 100. In some embodiments, a screen resolution parameter is a numerical variable indicating the resolution of the display 112 of device 100. In some embodiments, a display size parameter is a numerical variable or a plurality of variables that identify the area or dimensions of the display 112 of device 100. In addition to environmental and display parameters, in some embodiments, context is additionally determined by the application 146 currently in use on device 100. The current application in use on the device 100 is indicative a user's magnification preferences in addition to any display or environmental parameters.

Figure 8A:
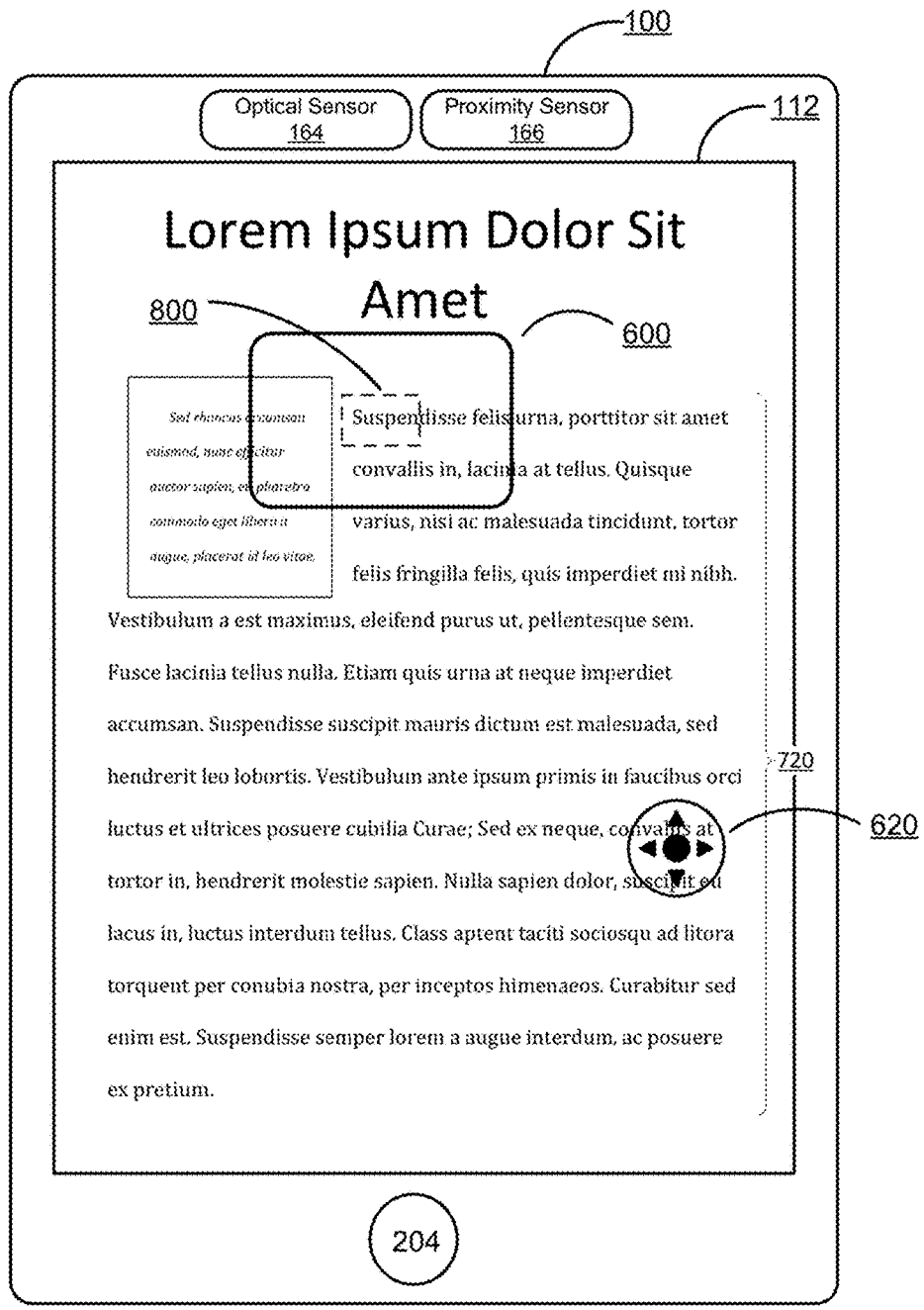
FIGS. 8A-8H illustrates the exemplary user interface at varying magnification levels depending on the determined context.

In some embodiments, the device 100 determines the context of a region corresponding to the location of a magnification window 600 as illustrated in FIG. 8A. Because of the positioning of the magnification window 600 and the corresponding magnification region 800 in FIG. 8A, the device 100 determines the context display parameters associated with region 720 of the user interface. The device 100 then determines the size of the magnification region 800 based on a zoom level determined in accordance with the context of region 720.

In some embodiments, the context associated with a magnification request of the user includes any number of display parameters, environmental parameters, or the current application in operation on device 100. In some embodiments, the context includes a subset of the parameters mentioned or additional parameters that have not been explicitly disclosed. The device determines a second zoom level 530 in accordance with the determined context 520. The device is configured to determine the second zoom level based on user preferences. User preferences are determined explicitly based on user settings on device 100 or implicitly by monitoring context associated with multiple user magnification requests over a period of time and creating a user zoom profile indicating preferred zoom levels corresponding to particular contexts. In some embodiments, both implicitly and explicitly identified zoom preferences are associated with a user profile. Thus, when a user signs on to another device 100 the zoom preferences are transferred to the second device. In some embodiments, the zoom preferences of a user may be associated with each device operated by the user as a user may have different preferences according to the device the user is operating. For example, a user may have different preferences when using a tablet than when using a smartphone and so a separate set of preferences for the same user may be maintained for each device. In some embodiments, one set of zoom preferences is maintained for all devices of a user, but are modified according to known trends regarding how preferences change between devices.

In some embodiments, the device 100 is configured to receive explicit user preferences to determine a preferable zoom level. The device 100 provides a number of settings allowing the user to specify preferable zoom levels. For example, the user may prefer a particular optical font size (e.g., a user may prefer to see size 24 point font on the screen), which is the font size after magnification, and so, in some embodiments, the device 100 has a setting that allows for the selection of a preferred optical font size. If the preferred optical font size is 24 point, the device will determine a zoom level that scales up a region of the user interface with font smaller than the preferred size to the preferred font size of 24 point in the user interface based on the displayed font size parameter of the region. Thus, the zoom level changes depending on the original font size of the text. For example, if the font in a region of a user interface is size 12 point then a zoom level of 2 would be selected to bring the optical font size to 24 point, however if the font size in a second region is 6 point then the a zoom level of 4 would be automatically selected to bring the font to the same optical font size.

In addition to providing a setting for a preferred optical font size, in some embodiments the device 100 also provides settings to modify the preferred optical font size of the user in response to the detection of particular contexts. For example, in some embodiments, the user is allowed to select a preferred font size in low light conditions. In some embodiments, instead of providing a setting for an additional preferred font size in different various contexts the additional settings specify a change in relation to the previously declared preferred optical font size. For example, in some embodiments, the user is allowed to opt to increase the preferred font size in low light conditions instead of specifying a particular preferred optical font size in low light conditions.

In some embodiments, explicit user settings provided by the device 100 are not limited to a preferred optical font size and also include settings regarding images and other graphics. For example, in some embodiments, the device 100 allows the user to specify a level of detail per area that they generally prefer, allowing the device 100 to select an appropriate zoom level for the magnification of images in the user interface. Additionally, just as discussed with regard to the preferred optical font sizes, in some embodiments, a preferred level of detail or other parameter based setting is modified as a result additional settings indicating user preferences in various contexts.

In some embodiments, zoom preferences are determined implicitly by the device 100. The device 100 is configured to receive manual zoom adjustments in addition to automatic zoom adjustments. The device 100 stores a zoom level corresponding to each manual adjustment along with the context associated with the manual adjustment. In some embodiments, the device 100 then creates a user zoom model based off of the received manual adjustments. In some embodiments, the device 100 requires a threshold number of adjustments to create the model. For example, the device 100 may receive 5 manual adjustments from a user before it creates a user zoom model. In some embodiments, the device 100 creates the model based off any number of user adjustments. In some embodiments, the device 100 continues to incorporate user adjustments into the model even if the model is used to determine a zoom level and the user manually adjusts the zoom level from the determined zoom level. The user profile contains he manual zoom adjustments of a user and the corresponding contexts. The device 100 then calculates correlations between parameters comprising the context associated with the manual adjustments and the manually adjusted zoom levels. In some embodiments, the device 100 uses supervised learning or other machine learning or statistical methods to determine a model describing the preferred zoom level of a user given particular input parameters that describe the context of a particular adjustment. A manual adjustment of the user amounts to a data point in the training data of the supervised learning or other algorithm. Because of the potentially high number of parameters comprising the context the algorithm, in some embodiments, takes advantage of methods to reduce the dimensionality of the fitting problem by relating parameters. For example, a relationship may be found between a screen brightness parameter and an ambient light parameter based on study conducted on vision impaired users. In some embodiments, to reduce the dimensionality of the problem a function is created relating two parameters such that the two parameters are represented as one input variable in the supervised learning algorithm.

In some embodiments, a feature selection algorithm is used to determine the parameters that are predictive of a user's preferred zoom level. A feature selection algorithm eliminates redundancies amongst the parameters describing the context while also determining particular contextual features that are most indicative of the preferred zoom level of a user. For example, in some embodiments, a feature selection algorithm determines that a subject user's preferred zoom level depends primarily on the font size parameter and eliminates confounding context parameters (e.g., the line spacing parameter or any other parameter that has an effect on a particular user).

Figure 8B:
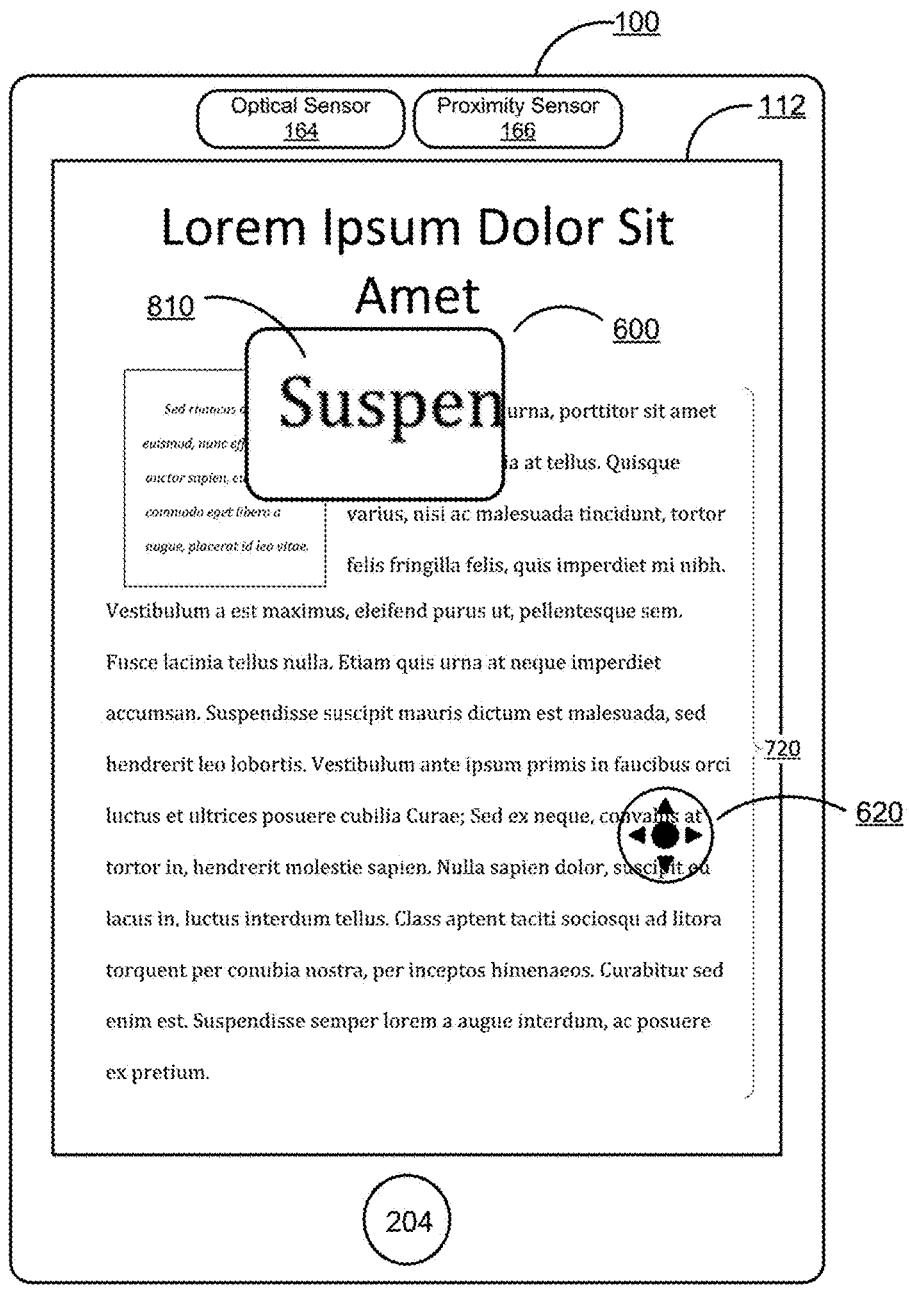

FIG. 8B illustrates the portion of the user interface of FIG. 8A corresponding to magnification region 800 displayed at the second zoom level determined by device 100. In this illustrative example the device 100 has determined, based on either explicit user preferences or implicit user preferences determined by a supervised learning model, that the user's preferred optical font size was 30 based on the location of the magnification window 600 in context region 720. The magnification region 800 was adjusted to a zoom level that results in the magnified view 810 of the user interface.

In addition to displaying the user interface at a second zoom level 530, in some embodiments, the device 100 displays the user interface with a display filter 535. Similar to displaying the user interface at a second zoom level 530 the device 100 determines a display filter automatically based on user preferences. In some embodiments, a user's filter preferences are determined explicitly through the adjustment of user settings corresponding to particular contexts, or are determined implicitly through receiving a plurality of manual filter adjustments and a creation of a supervised learning model based on the manual filter adjustments and their associated contexts. The device 100 displays the user interface after applying one of a variety of filters including but not limited to a grayscale filter, an inverse color filter, a colorblind shift filter, and a contrast filter. A grayscale filter changes colors in an image to shades of gray, an inverse color filter inverses colors in an image, a color blind filter modifies colors confused due to colorblindness in an image to make them more identifiable to individuals affected by color blindness, and a contrast filter either increases or decreases the contrast in an image.

Once the device 100 has determined a second zoom level in accordance with the context of the device 100 and has displayed the user interface at that second zoom level 530 the device 100, in some embodiments, the device 100 is configured to monitor its context for a change in context. In response to a change in context the device 100 displays a portion of the user interface at a third zoom level 540 different from the first or default zoom level and the second zoom level determined in step 530. The change of context may be due to a user action, such as the user changing the position of the magnification region. In some embodiments, a change in one of the environmental parameters or a change to the user interface due to a process of a currently running application results in device 100 displaying the user interface at a third zoom level 540.

In some embodiments, the third zoom level is determined in much the same way as the second zoom level in step 530, using either the same explicitly defined user preferences or the same machine learning or statistical model of the user's implicit preferences. Optionally, in cases where the change in context is due to a user action, the user action is considered part of the context and so is considered as a parameter in the machine learning or statistical model.

Figure 8C:
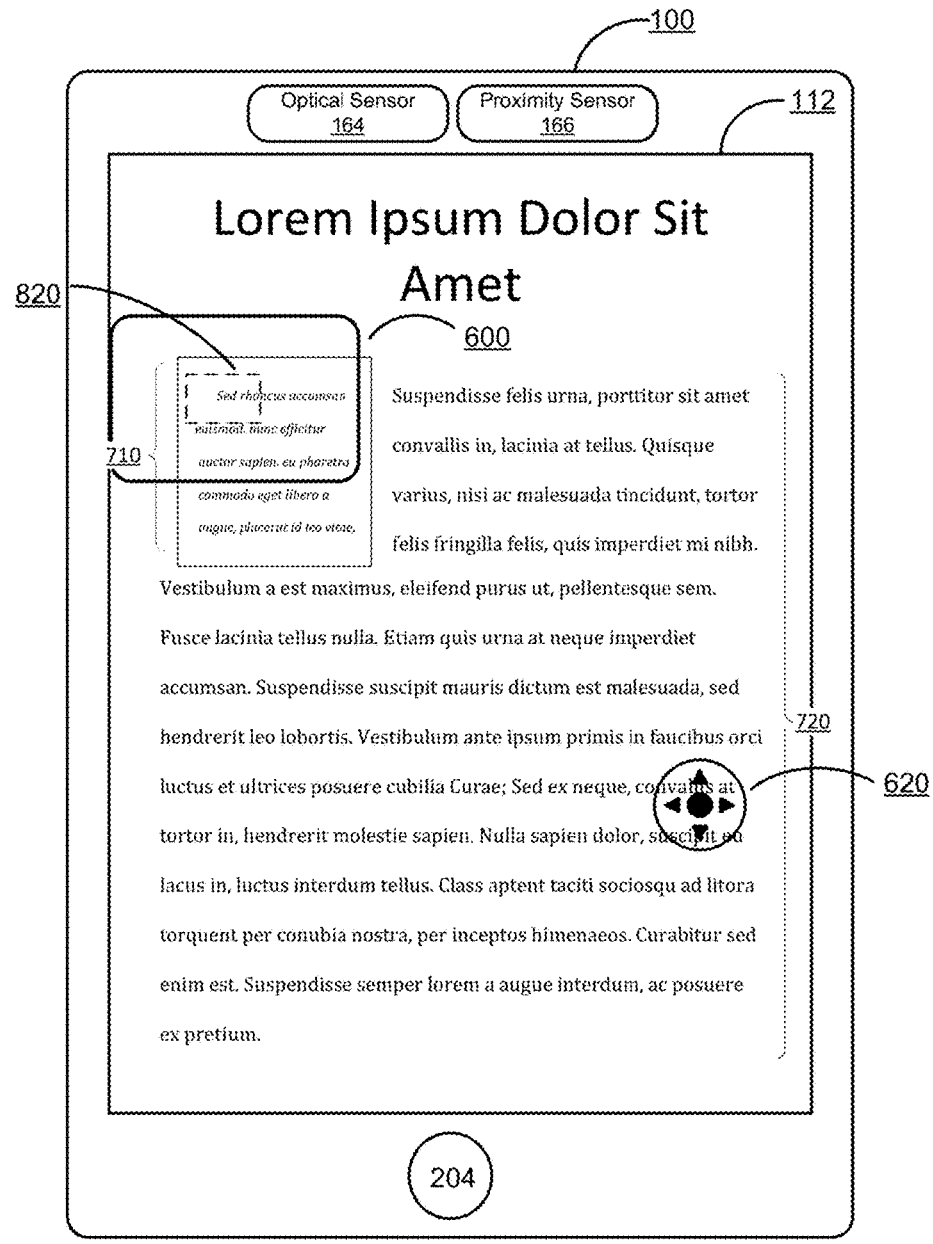
Figure 8D:
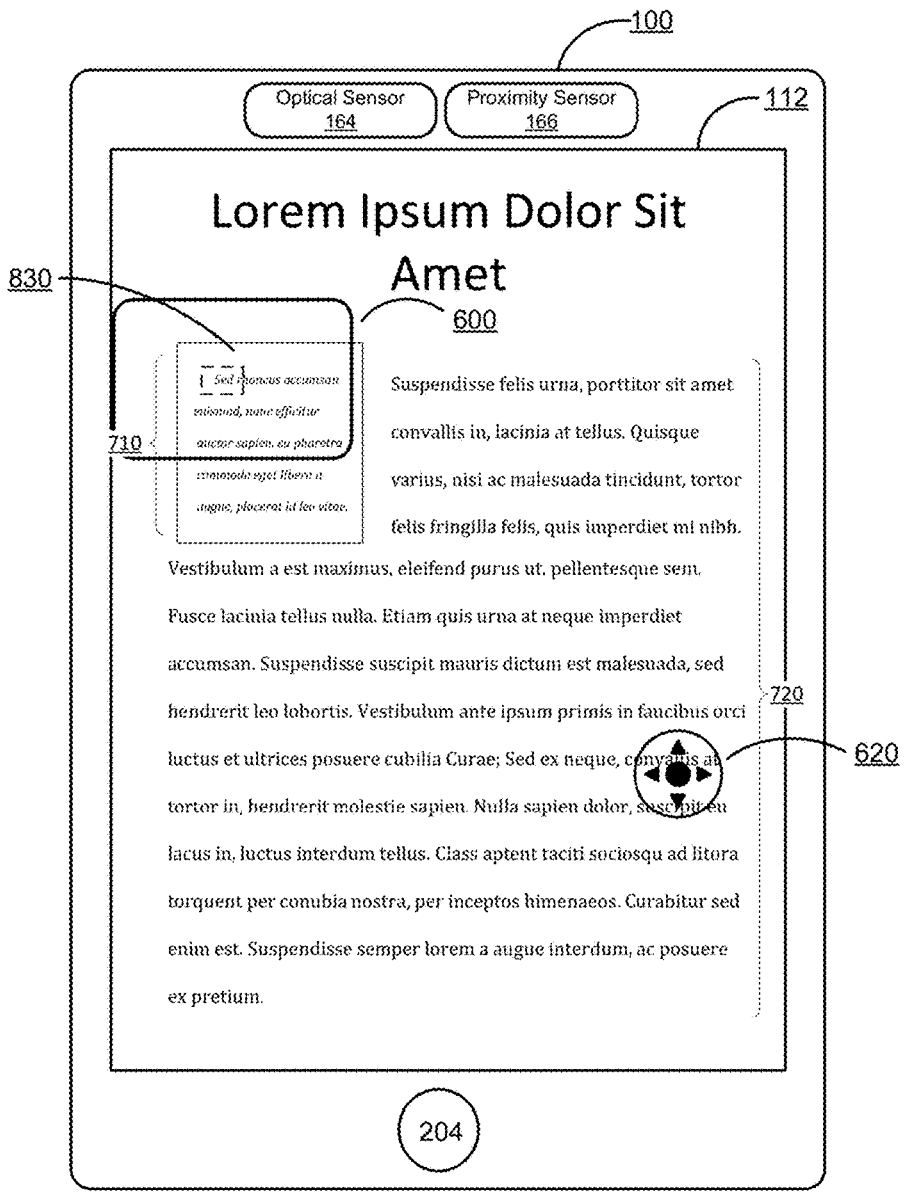
Figure 8E:
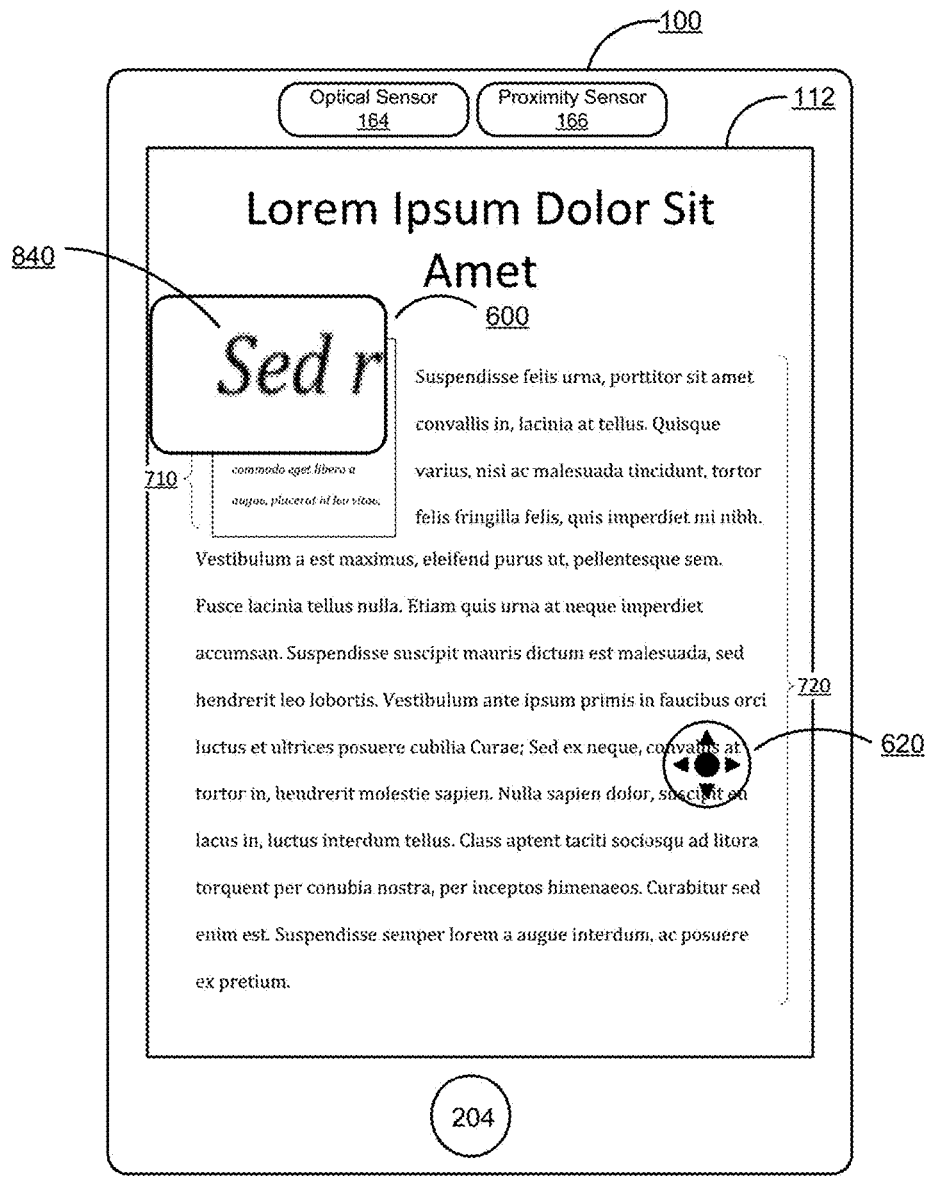

FIG. 8C illustrates an example of a change in context due to user action. In the case of FIG. 8C the device 100 receives an input from the user to move the magnification window 600 and corresponding magnification region to a new location of the user interface. The magnification region of the new location 820 is the same size as the magnification region 810 and so corresponds to the same zoom level despite being in a different context region 710, which has a smaller font size and so necessitates a higher zoom level. However, as illustrated in FIG. 8D, if the device 100 is configured to perform step 540 the zoom level and therefore the size of the magnification region 830 is modified in accordance with the new context of context region 710. As a result, as illustrated in FIG. 8E, the magnified portion of the user interface 840 corresponding to magnification region 830 has the user's preferred optical font size of size thirty. In some embodiments and depending on other context parameters the user's preferred optical font size changes in accordance with the change in context.

Figure 8F:
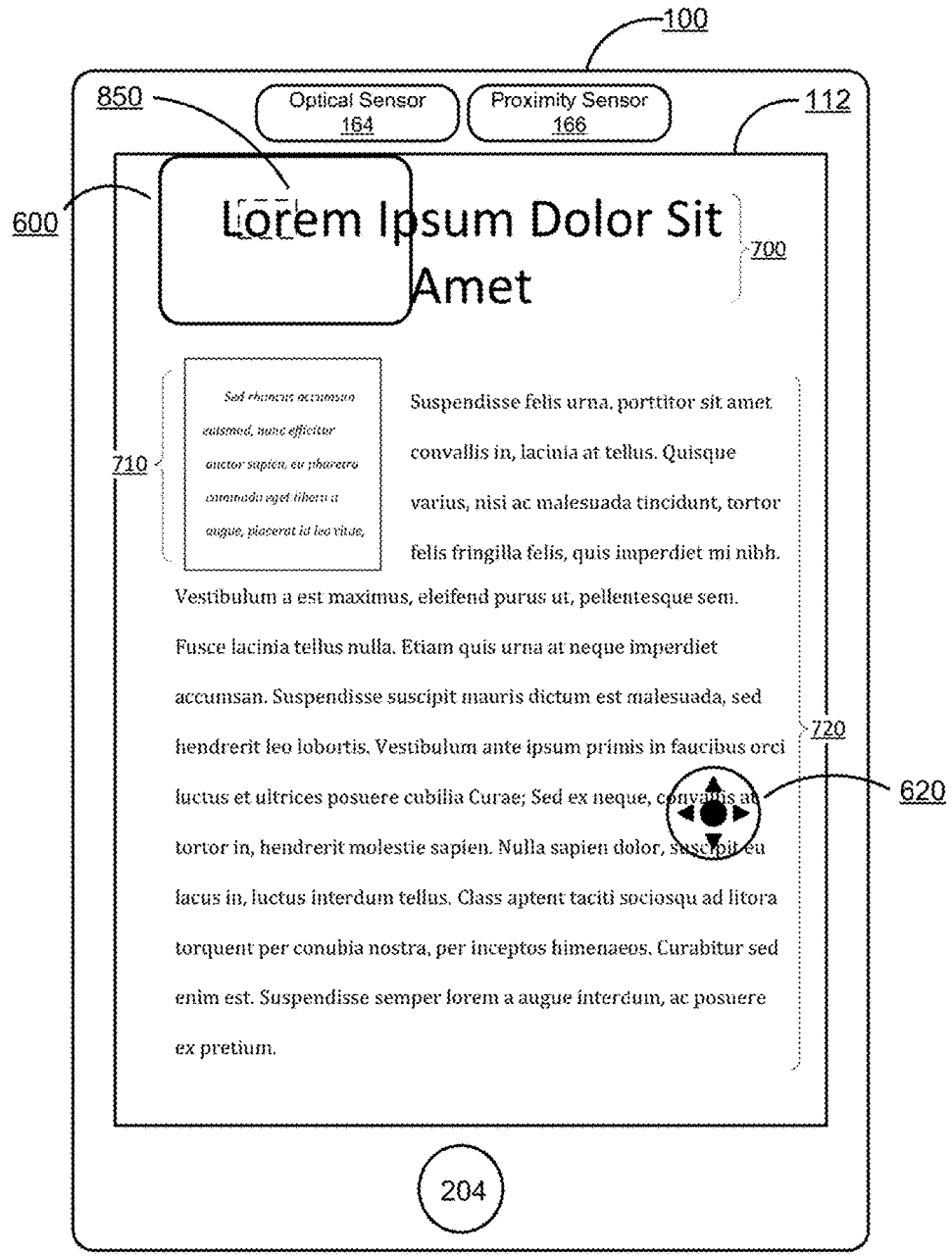
Figure 8G:
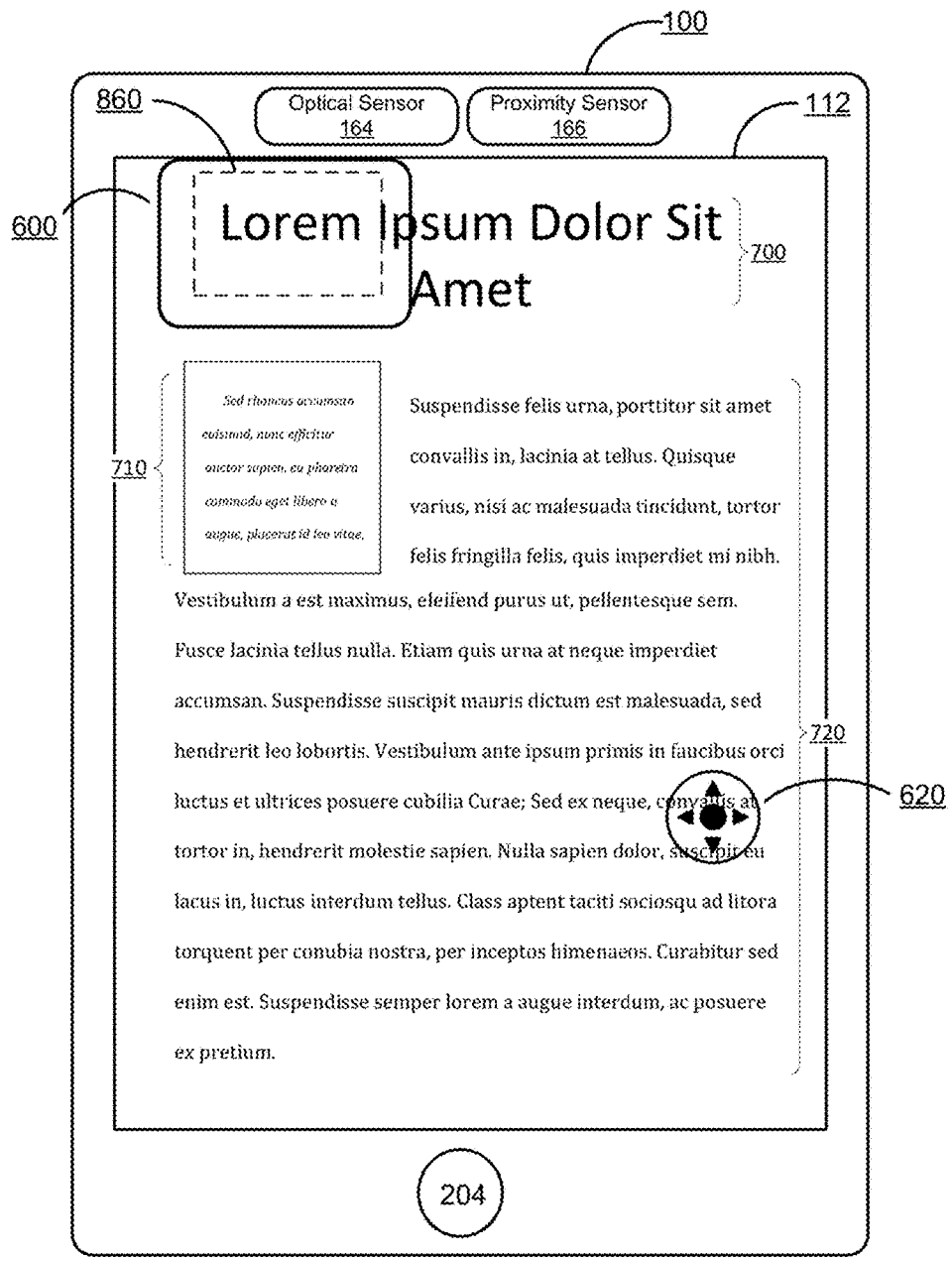
Figure 8H:
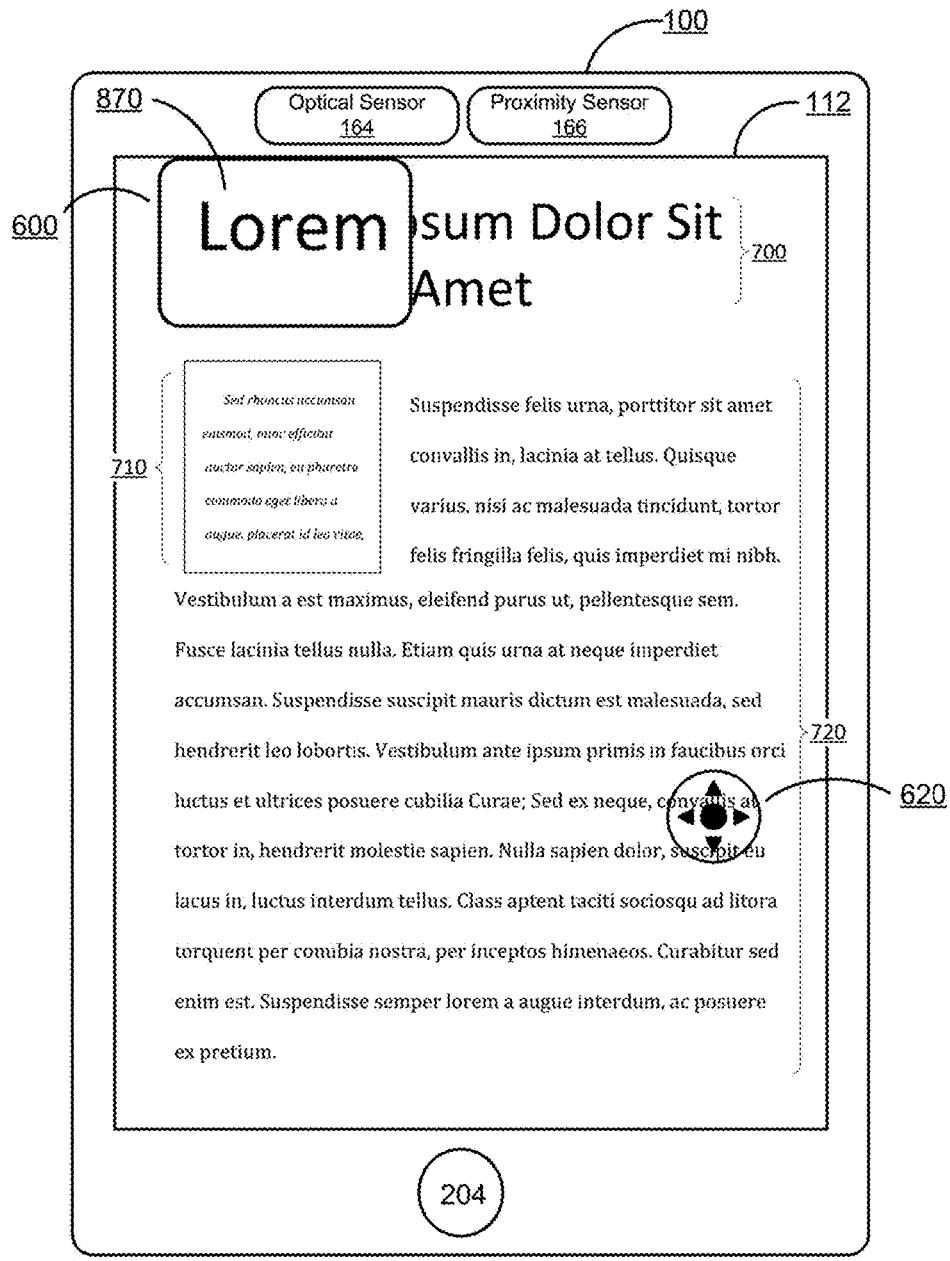

In some embodiments, the device 100 is configured to monitor its context and modify the zoom level in accordance with changes in context at any time. In some embodiments, this results in continuous automatic adjustment of the zoom level of the magnified portion of the user interface. Further zoom level adjustment beyond a first adjustment, is illustrated in FIGS. 8F-8H as the device 100 receives a further user command to change the location of the magnification window 600 and the corresponding magnification region to context region 700. This results in a change in magnification region size from magnification region 850 in FIG. 8F to magnification region 860 in FIG. 8G. The size of magnification region 860 results in a different fourth zoom level that is less than the third and second zoom levels in accordance with the new context of context region 700. FIG. 8H illustrates the magnified portion of the user interface 870 magnified at the fourth zoom level. Additional changes to the context and corresponding changes in zoom level are possible whether they are in response to a change in environment or display parameters.

User Interface with Zoom Enhancement for Text Input

Figure 9:
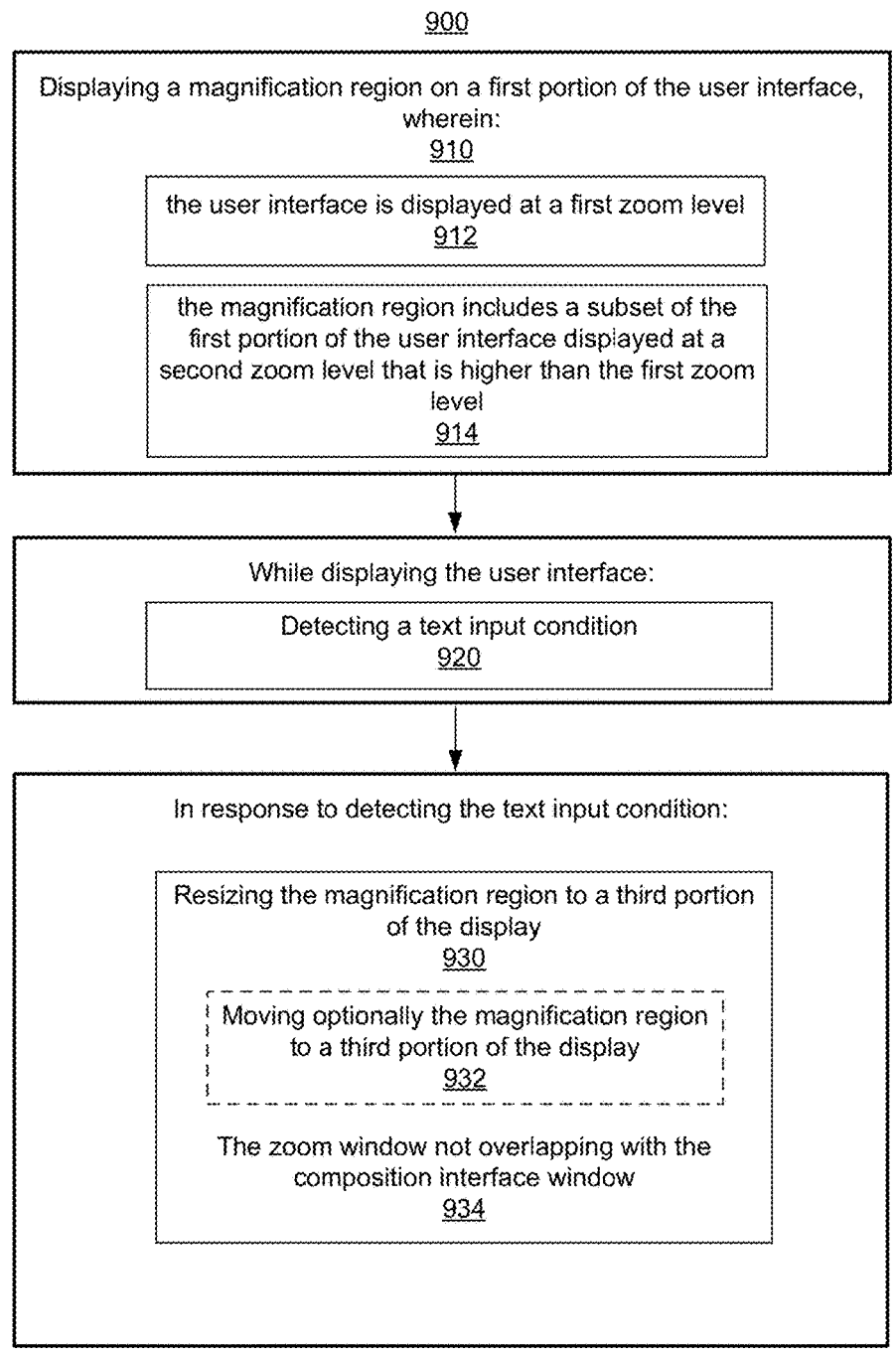
FIG. 9 shows a flowchart illustrating a method using zoom enhancements to facilitate text input on electronic devices with touch-sensitive displays for low-vision users, according to some embodiments

FIG. 9 is a flowchart illustrating a method 900 using zoom enhancements to facilitate text input on electronic devices with touch-sensitive displays for low-vision users, according to some embodiments. The method allows the user to view and interact at the same time with both a magnification region, which is the target of the inputted text, and a composition interface window, e.g., a keyboard, through which the user inputs the text. The method places the magnification region such that it allows the user to use at once both the composition interface window and a text input region within the magnification region. In some embodiment, the method maintains the focus of magnification region on the text being displayed in the text input region while the user inputs the text through the composition interface window. Prior to displaying a magnification region, the device displays the user interface at a first zoom level on the display. Upon receiving a magnification request as described in detail above, the device displays a magnification region on the display at a second zoom level. By moving the magnification region around on the display, the content displayed within the magnification region changes without the need of the user scrolling the user interface. For example, the user can move the magnification region by grabbing a handle of the magnification region, and optionally applying momentum to the magnification region.

The method 900 is performed at an electronic device with a display and an input device, such as the portable multifunction device 100 shown in FIG. 1A or device 300 shown in FIG. 3, as may be controlled by specially programmed code (computer programming instructions) contained in the graphics module 132, wherein such specially programmed code is not natively present in the device 300. Some embodiments of the method 900 may include fewer, additional, or different steps than those shown in FIG. 9, and the steps may be performed in different orders. The steps of the method 900 are described with respect to example user interfaces illustrated in FIGS. 10A-10F.

Figure 10A:
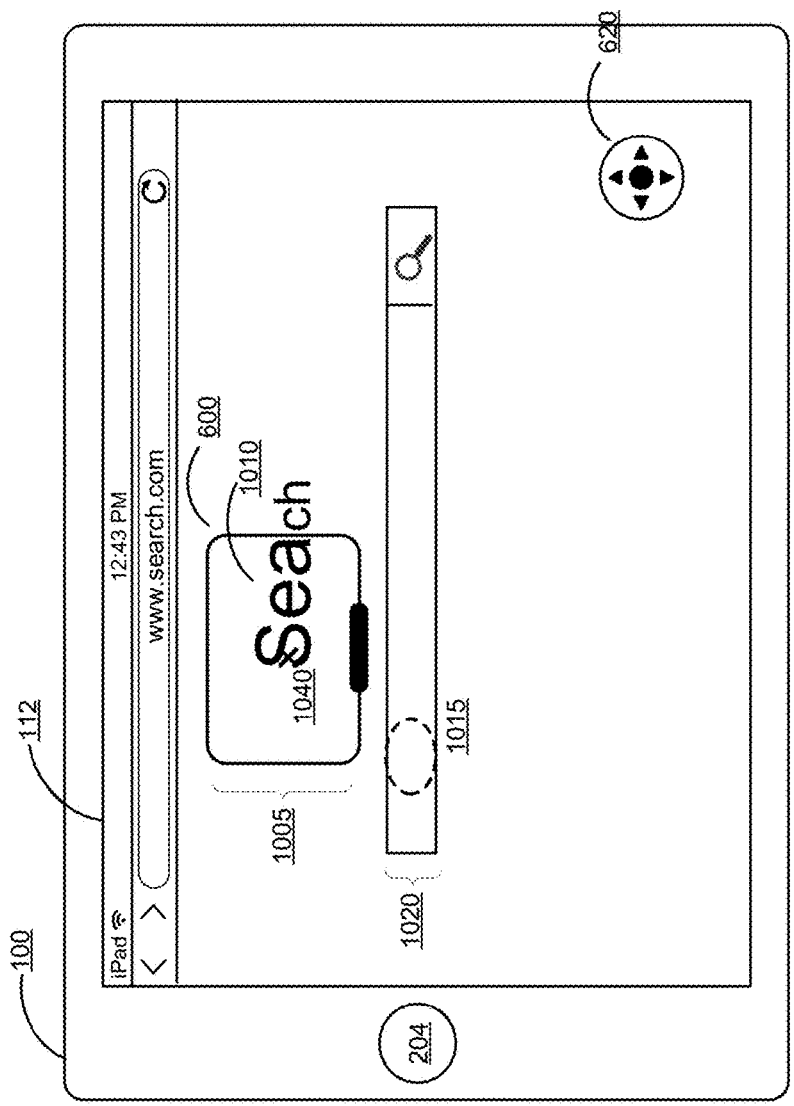

Referring to FIGS. 9 and 10A, the electronic device 100 displays 910 on a touch-sensitive display 112 a magnification region 600 on a first portion 1005 of the user interface, which the electronic device displays 912 at the first zoom level. The magnification region includes a subset 1010 of the first portion of the user interface, and electronic device displays 914 the magnification region at the second zoom level that is higher than the first zoom. In some embodiments, the magnification region is a zoom window or a zoom lens.

Figure 10B:
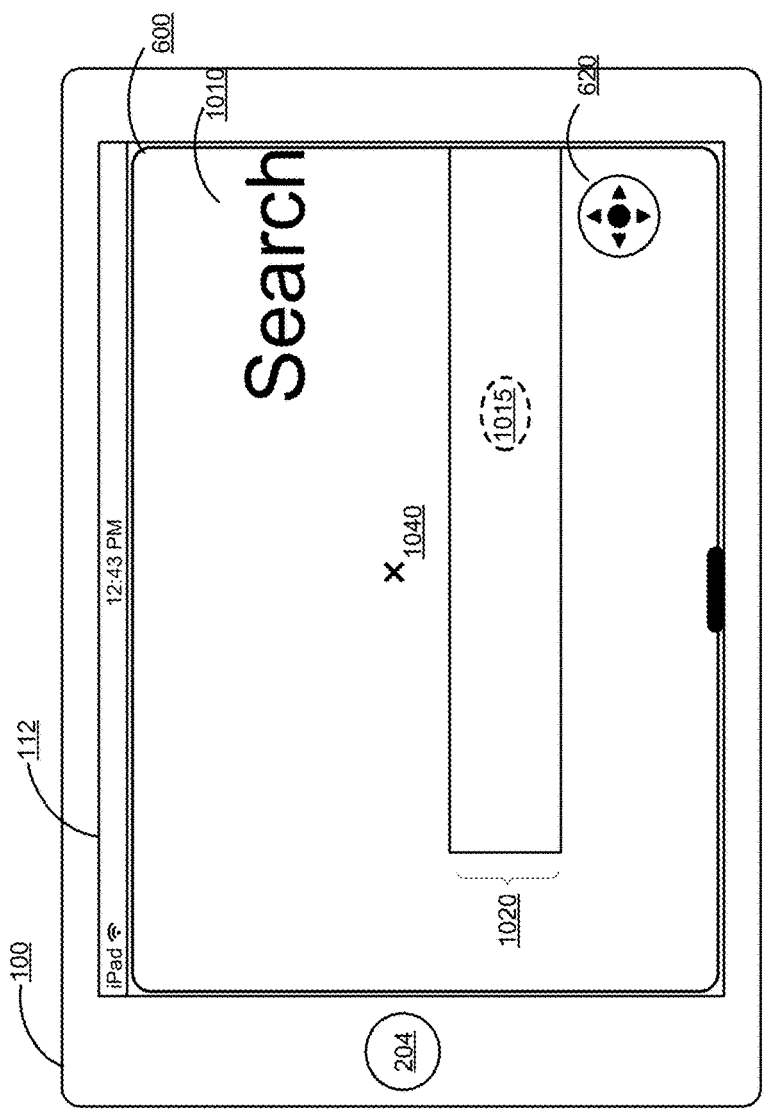

While displaying the user interface, the electronic device detects 920 a text input condition. As illustrated in FIG. 10A, in some embodiments, the text input condition is the device receiving a text input gesture. The text input gesture optionally includes a contact 1015 of the user's finger with the touch-sensitive display 112 at a location of a text input region 1020. In the example illustrated in FIG. 10A, the contact 1015 and the text input region 1020 are located outside the magnification region. As illustrated in FIG. 10B, in some embodiments, the subset 1010 of the first portion of the user interface included in the magnification region represents a large portion of the entire user interface. In this full-window mode, the magnification region takes up almost the entire display prior to the display of a composition interface window. In some embodiments, as shown in FIG. 10B, the contact 1015 and the text input region 1020 are displayed within the magnification region. In some embodiments, the contact is within the magnification region while part of the text input region extends beyond the magnification region.

In some embodiments, the text input condition is a request by an application running on the device to input text via composition interface window on the display. A composition interface window includes, for example, a keyboard or keyboard window that allows the user to enter text to the device. In some embodiments, the text input condition includes the user opening an application, for example, a notes application. When opening the application, the device receives the text input condition from the application. In the embodiments illustrated in FIGS. 10A and 10B, the application, for example, a browser application requires an additional user interaction with the application before sending a text input condition to the device for further processing. As described above, a text input gesture with the user contacting a text input region is such an interaction that causes the application to send a text input condition to the device.

Figure 10C:
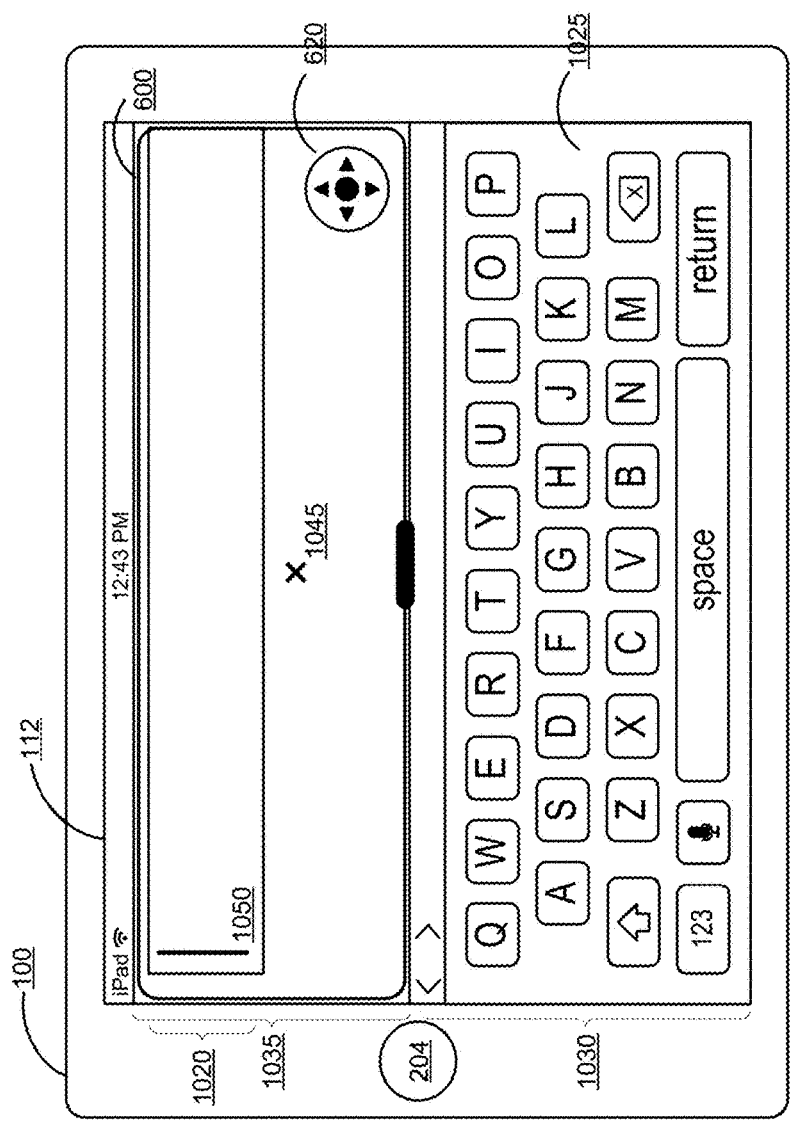

In response to detecting the text input condition, the device displays 930 a composition interface window 1025 in a second portion 1030 of the display as illustrated in FIG. 10C. In addition, the device resizes 932 the magnification region to a third portion of the display such that the magnification region does not overlap with the composition interface window. As illustrated in FIG. 10C, in some embodiments, the second portion 1030 of the display including the composition interface window 1025 is located below the third portion 1035 that includes the magnification region. In some embodiments, the device optionally moves 934 the magnification region to the third portion 1035 of the user interface. FIG. 10C illustrates the result of such movement, in which the device has moved the geometric centers 1040 of either magnification region, respectively shown in FIG. 10A or 10B, to a new location 1045 relative to the display 112. For example, in response to detecting a text input gesture, the device displays a keyboard in the second portion of the user interface while moving the zoom lens so that it does not overlap with the keyboard. In some embodiments, the second portion includes the lower (bottom) half of the display, while the third portion includes the top part of the display and does not overlap with the second portion. Avoiding an overlap between the portions allows the user to view and interact with the third portion (e.g., the zoom lens) of the inputted text and the second portion (e.g., the onscreen keyboard) at the same time.

As shown in FIG. 10C, in some embodiments, in response to detecting the text input condition, the device re-adjust the location of the directional pad 620 ("d-pad") so that the directional pad is not overlaid on top of the composition interface window. In FIG. 10C, the device instead moves the directional pad upwards from its original position along the right edge of the display so that the directional pad 620 is within the third portion of display, including the magnification region. In some embodiments, the directional pad 620 fades out, when the composition interface window comes into focus, e.g., by the user contacting the keys on a keyboard window to type text. In some embodiments, the device disables the repositioning and/or resizing mode of magnification region while displaying the composition interface window. Again, in some embodiments, the device indicates that the repositioning and/or resizing mode is disabled by fading out the directional pad 620. Upon rotating the device, the orientation of the magnification region relative to the composition interface window does not change. For example, upon rotating the landscape view of the device as shown in FIG. 10C to portrait view, the magnification region remains located at the display top with the composition interface window at the bottom of the display. Furthermore, in some embodiments, when rotating from landscape to portrait view the horizontal and vertical size of each window changes so that both resized windows together continue to fill out the entire display.

Figure 10D:
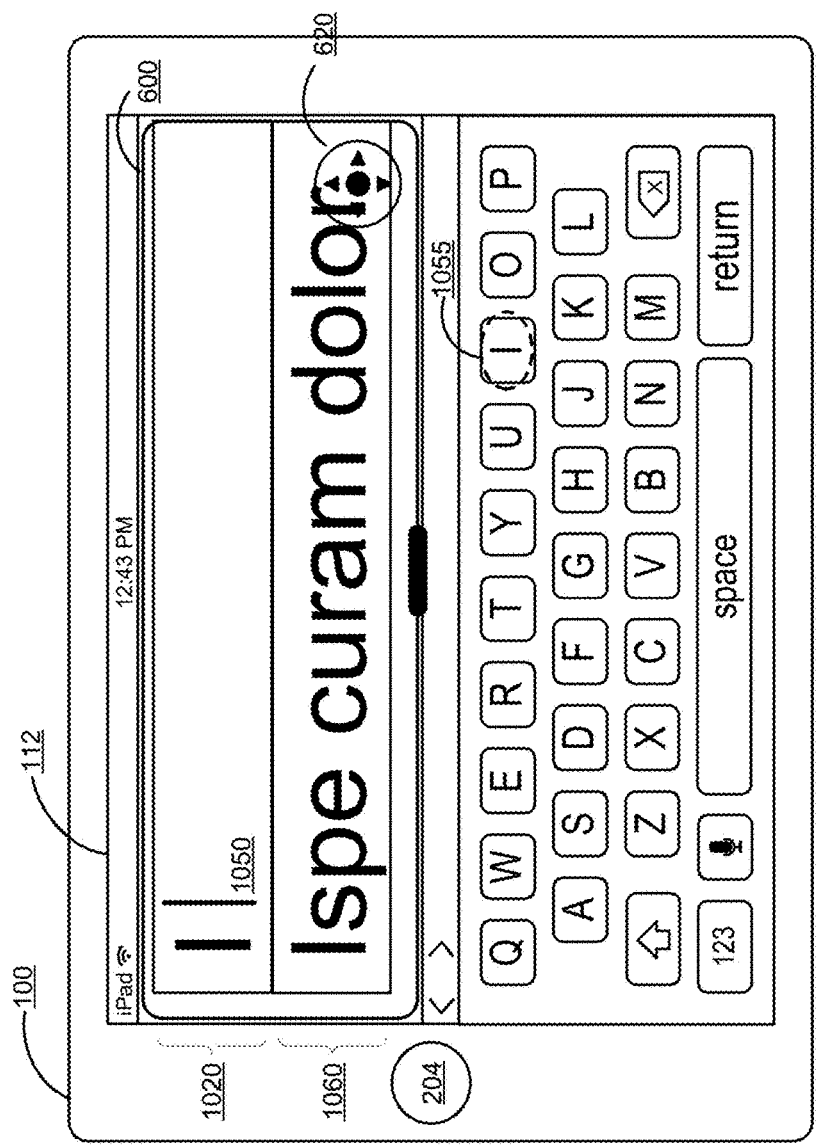

Referring to FIGS. 10C and 10D, in some embodiments, the device also moves the focus 1050 of the magnification region to the text input region so that the magnification region displays the text as it is being entered by the user. The focus of the magnification region then stays on text entry point as the user types. For example, the zoom lens follows the text as it is being typed with the text shifting to the left with the location of magnification region fixed on the display. The device therefore updates the content displayed within magnification region such that the magnification region always focuses on text entry point as the user types.

As shown in FIG. 10D, in some embodiments, the user enters text into a text input region or text field. As the user enters text, the device detects text input at a location corresponding to the composition interface and displays the entered text in the text input region that the magnification region focuses on. In some embodiments, the text input by the user includes a keyboard gesture that is a contact 1055 with the touch-sensitive display 112 at a location within the keyboard window 1025. In some embodiments, the device also displays a word completion 1060 of the already entered text within the magnification region. The device maintains the focus of the magnification region on the location where the next text character to be entered in the text input region is displayed.

Figure 10E:
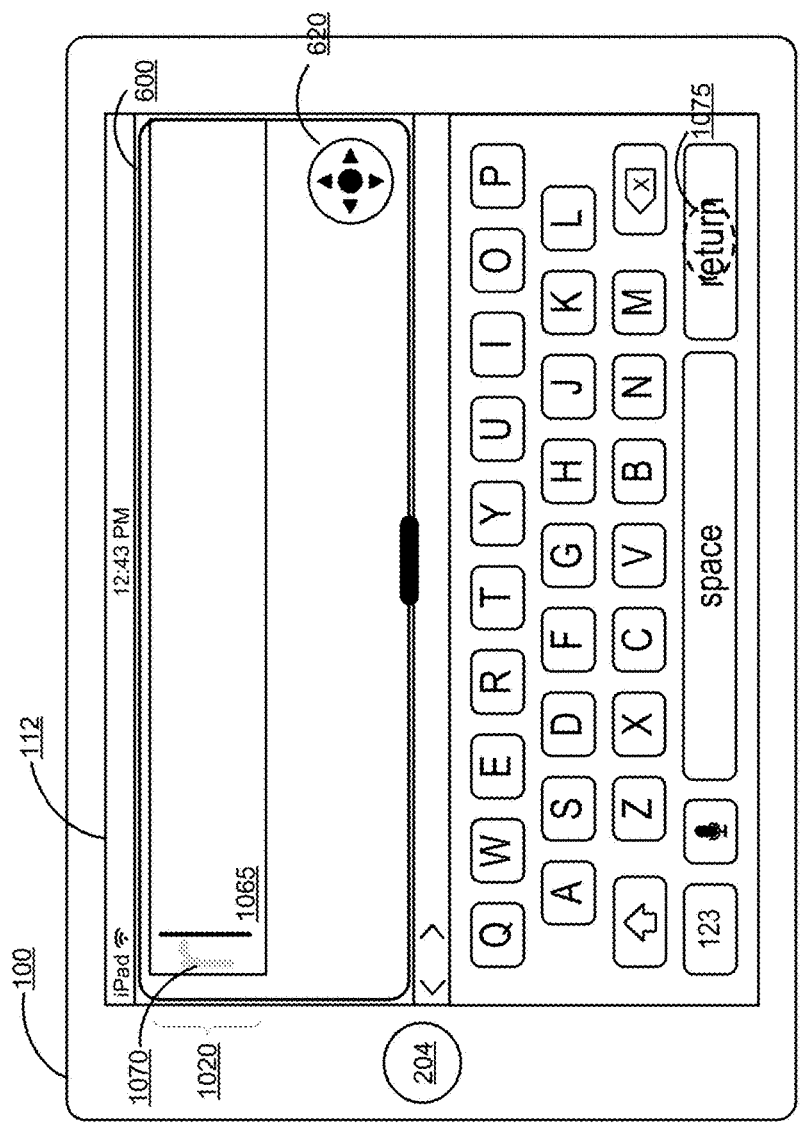

Referring to FIG. 10E, in some embodiments, the device shifts the focus of the magnification region to a new location 1065 in the text input region if the entered text exceeds the size of the magnification region. In this case, the magnification region stays fixed while shifting the text input region to the left. As shown in FIG. 10E, the previously entered text is not visible anymore (indicated by only the last entered character 1070 being shown and grayed-out), while the text input cursor is display again at the left boundary of the magnification region. A stop-keyboard condition removes the composition interface window from being displayed on the user interface. In some embodiments, a stop-keyboard condition includes a keyboard gesture that is a contact 1075 with the touch-sensitive display 112 at a location on a stop-key of the keyboard. As shown in FIG. 10E, in some embodiments, a stop-key includes the "enter" key. In some embodiments, the application automatically sends a stop-keyboard condition to the device if the entered text exceeds a threshold condition, e.g., the number of entered characters exceeding a maximum number.

Referring to FIG. 10F, in response to receiving a stop-keyboard condition, the device displays the user interface without the composition interface window. For example, in response to selecting an "enter" key or a "remove-keyboard" key, the device re-displays the magnification region at the size prior to receiving the text input condition and moves the focus to the location of the first entered text character 1080 with the entered text displayed in the text input region 1020. The portion of the user interface not including the magnification region is displayed at the first zoom level. In some embodiments, upon receiving a stop-keyboard condition, the device displays the original magnification region at the original location on the user interface with the original focus prior to receiving the text input condition. In some embodiments, the device further re-adjust the location of directional pad 620 to original location on the user interface prior to receiving the text input condition.

User Interface with Zoom Enhancement Using Auto-snap Feature

Figure 11A:
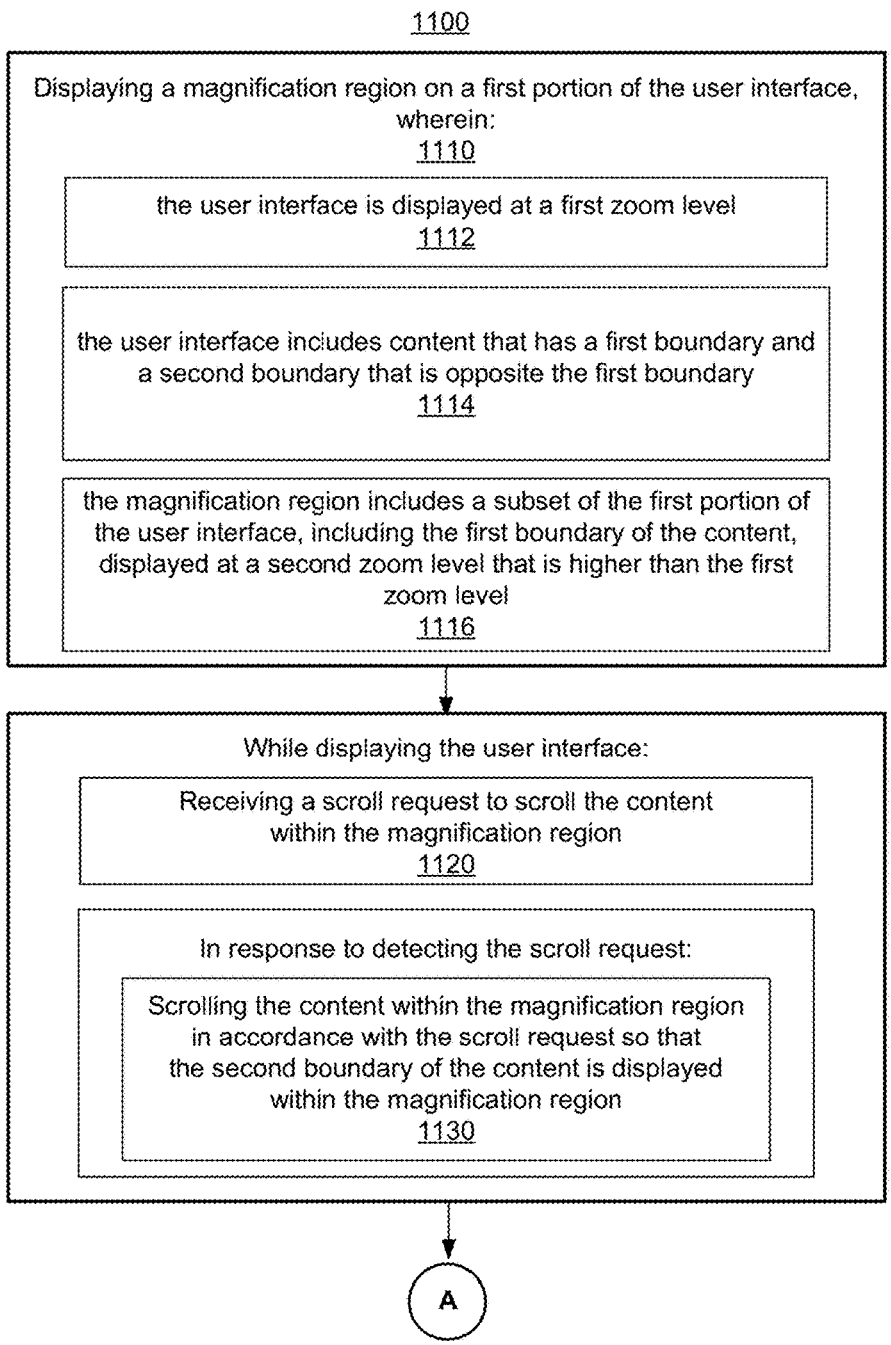
FIGS. 11A and 11B illustrate a flowchart of a method for scrolling content in a magnification region on electronic devices with touch-sensitive displays for low-vision users, according to some embodiments.
Figure 11B:
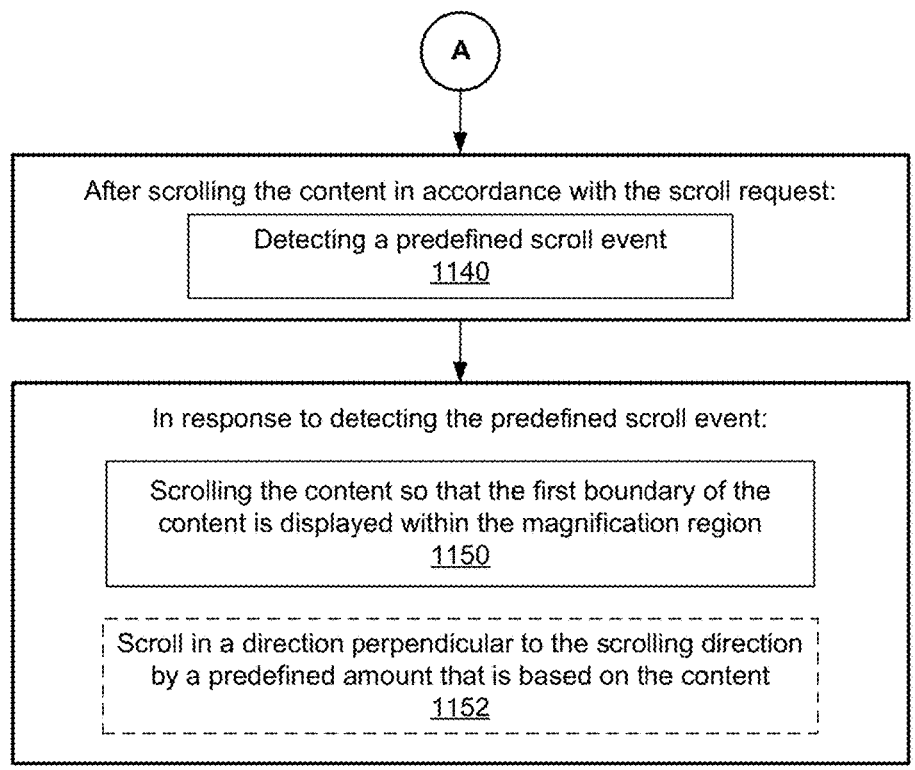

FIGS. 11A and 11B illustrate a flowchart of a method 1100 for scrolling content in the magnification region on electronic devices with touch-sensitive displays for low-vision users, according to some embodiments. The method by using an auto-snap feature reduces the time and effort required to position the magnification region back to the beginning of the next line of content to be displayed within the magnification region. Thus, the auto-snap feature is a reading feature that minimizes the time for repositioning, for example, the zoom lens at the beginning of the next line to be read. Prior to displaying a magnification region, the device displays the user interface at a first zoom level on the display. Upon receiving a magnification request as described in detail above, the device displays a magnification region on the display at a second zoom level. By moving the magnification region around on the display, the content displayed within the magnification region changes without the need of the user scrolling the user interface. For example, the user can move the magnification region by grabbing a handle of the magnification region, and optionally applying momentum to the magnification region.

The method 1100 is performed at an electronic device with a display and an input device, such as the portable multifunction device 100 shown in FIG. 1A or device 300 shown in FIG. 3, as may be controlled by specially programmed code (computer programming instructions) contained in the graphics module 132, wherein such specially programmed code is not natively present in the device 300. Some embodiments of the method 1100 may include fewer, additional, or different steps than those shown in FIGS. 11A and 11B, and the steps may be performed in different orders. Some embodiments, performing methods 500 and 900, described above, may perform the method 1100 while methods 500 and 900 are in operation. The steps of the method 1100 are described with respect to example user interfaces illustrated in FIGS. 12A-12F.

Figure 12A:
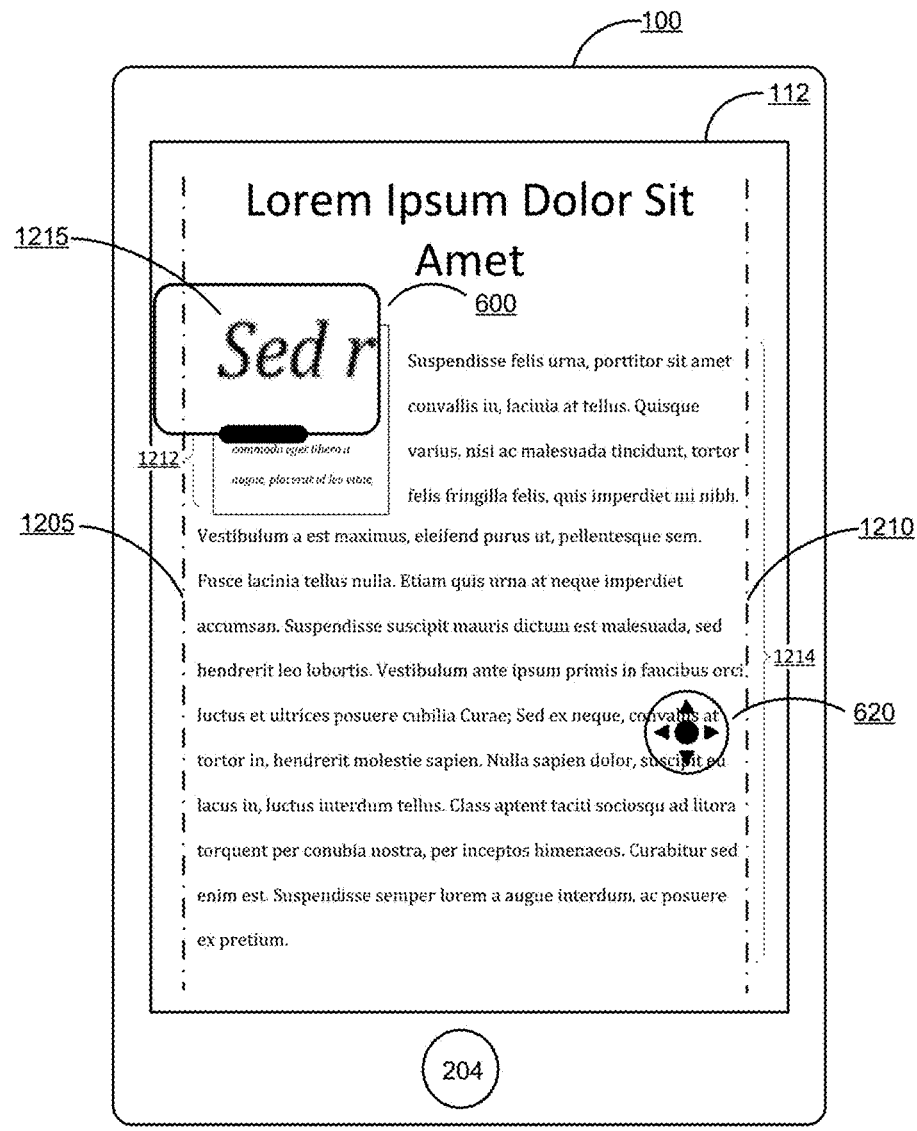
FIGS. 12A-12F illustrates scrolling content in a magnification region from a first boundary to a secondary boundary of the content before auto-snapping back to the first boundary, according to some embodiments. The figures depict, and the detail description describes, various non-limiting embodiments for purposes of illustration only. One skilled in the art will readily recognize from the following discussion that alternative embodiments of the structures and methods illustrated herein optionally are employed without departing from the principles described herein.

Referring to FIGS. 11A and 12A, the electronic device 100 displays 1110 on a touch-sensitive display 112 a magnification region 600 on a portion of the user interface, which the electronic device displays 1112 at the first zoom level. The user interface includes content that has a first boundary 1205 and a second boundary 1210 that is opposite the first boundary. In some embodiments, the content is text and the first boundary is a beginning of a line of text with the second boundary being the end of the line of text.

For example, a page of text in Western European font is written left-to-right having a left and right margin that represents the first and second boundary, respectively. Text of some languages, e.g., Asian languages, are written top-to-bottom in a vertical format. In this case, the top and bottom margins of a text page in vertical format represent a first and second boundary, respectively. Thus, the first and second boundaries refer, in some embodiments, to a right and left boundary, and in some embodiments, to a top and bottom boundary of the user interface's content. In the method 1100, the displayed magnification region further includes a subset 1215 of the first portion of the user interface and the subset includes the first boundary of the content. The electronic device further displays 1114 the magnification region at the second zoom level that is higher than the first zoom. In some embodiments, the magnification region is a zoom window or a zoom lens.

Figure 12B:
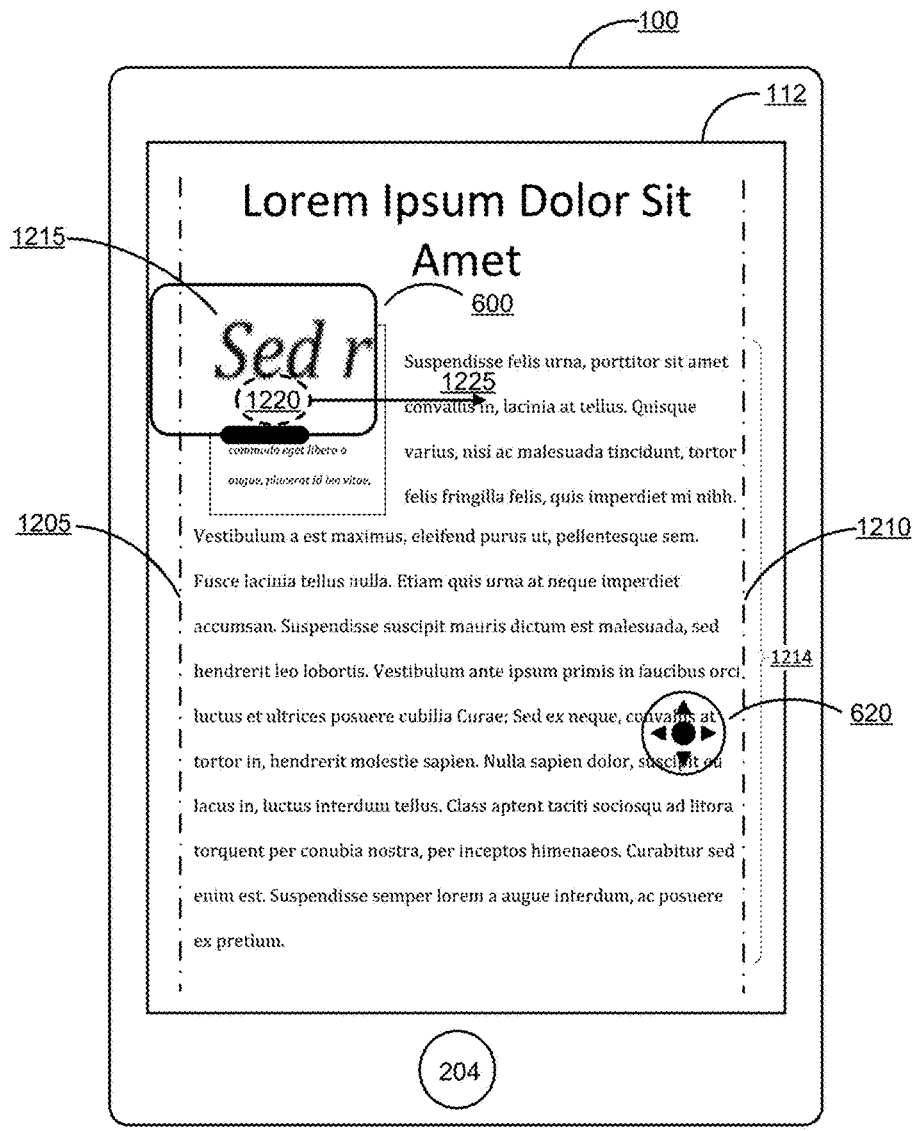
Figure 12C:
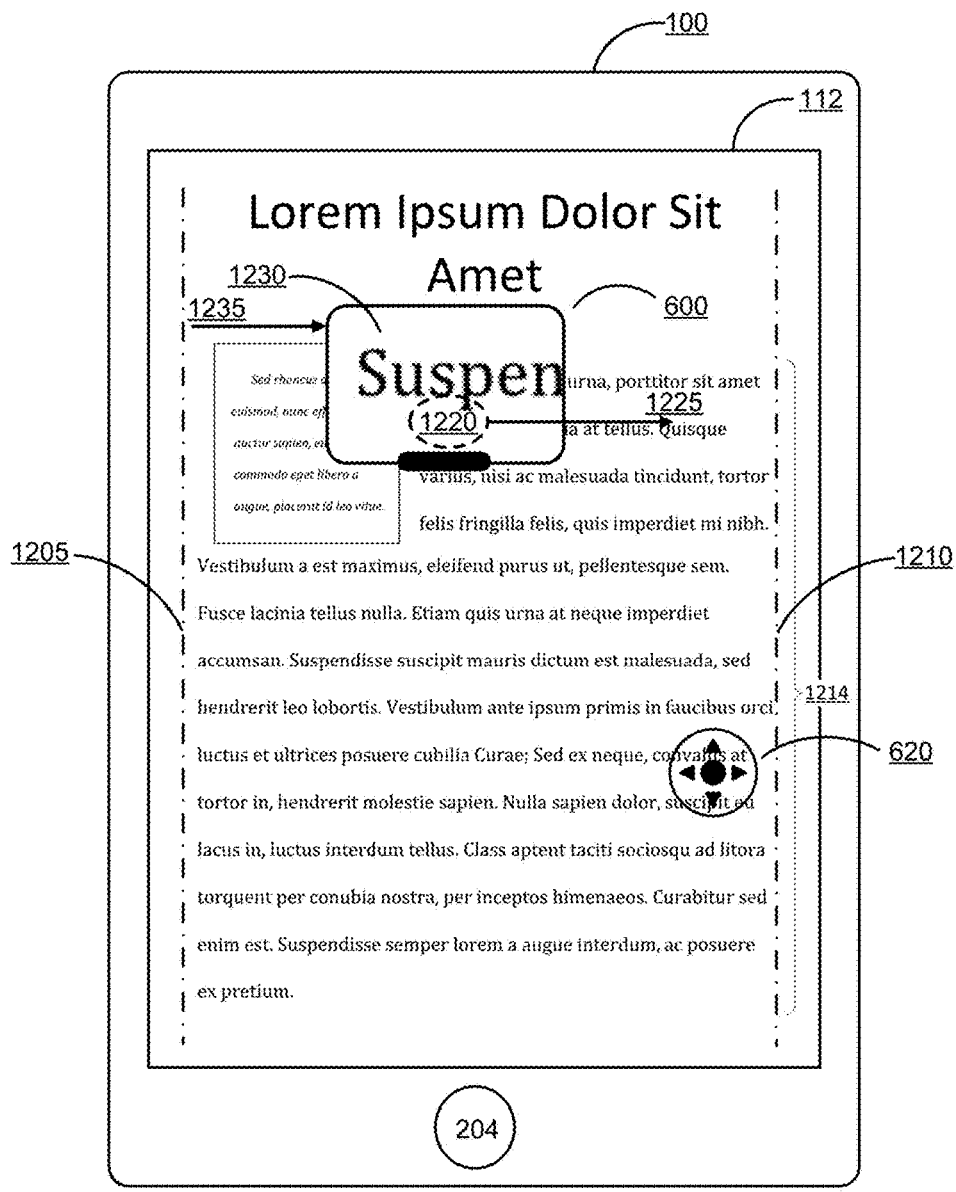

While displaying the user interface, the electronic device detects 1120 a scroll request to scroll the content within the magnification region. In some embodiments, the scroll request is the device receiving a scroll condition, e.g., the user tapping on the border of the magnification region and then dragging or using a joystick to move the content within the magnification region. As illustrated in FIG. 12B, in some embodiments, the scroll request includes a scroll gesture that includes a contact 1220 with the touch-sensitive display 112 at a location within the magnification region. The scrolling gesture optionally includes a swipe or flick motion in a direction substantially parallel or correlated to the scrolling direction through a contact of the user's finger with the touch-sensitive display 112. As shown FIG. 12B, in some embodiments, the scrolling gesture is represented by the contact 1220 of the user's finger on user interface, shown as a dotted ellipse and moving in the right direction 1225 relative to the orientation of the device. As shown in FIG. 12C, in some embodiments, in response to a scrolling gesture, the device displays the magnification region moved to a location 1230 on the user interface that is to the right of its previous location. In some embodiment, upon scrolling the content the first boundary of the content ceases to be displayed within the magnification region. In some embodiments, regions of the user interface outside of the magnification region remain displayed at the first zoom level when scrolling content within the magnification region. Scrolling the user interface under the magnification region through a scrolling gesture results in changing of the content that the device displays in magnification region. In some embodiments, the device detects the scroll gesture within the magnification region, and in some embodiments, outside the magnification region.

In response to detecting the scroll request, the device scrolls 1130 the content within the magnification region in accordance with the scroll request until the second boundary of the content is displayed within the magnification region. As shown in FIG. 12C, in some embodiments, when scrolling the content of the user interface, the content scrolls within the magnification region in a first direction 1235 before the second boundary 1210 is displayed within the magnification region. For example, when the distance between the two boundaries extends beyond the magnification region's width along the scrolling direction, the first boundary leaves the region at one side before the second boundary enters the magnification region from the other side. In some embodiments, while concurrently displaying both the first and second boundary in the user interface outside the magnification region, within the magnification region, when the first boundary is displayed, the second boundary is not displayed, or when the second boundary is displayed, the first boundary is not displayed.

Figure 12D:
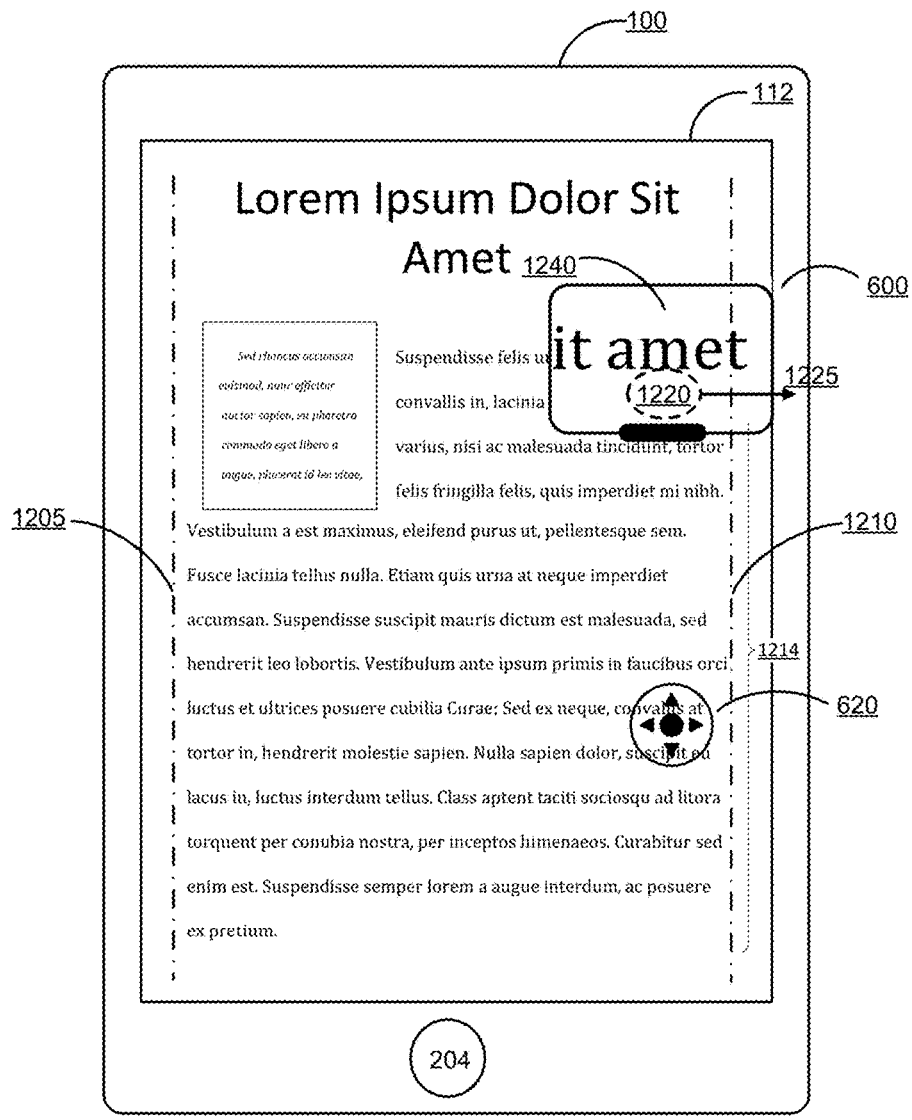
Figure 12E:
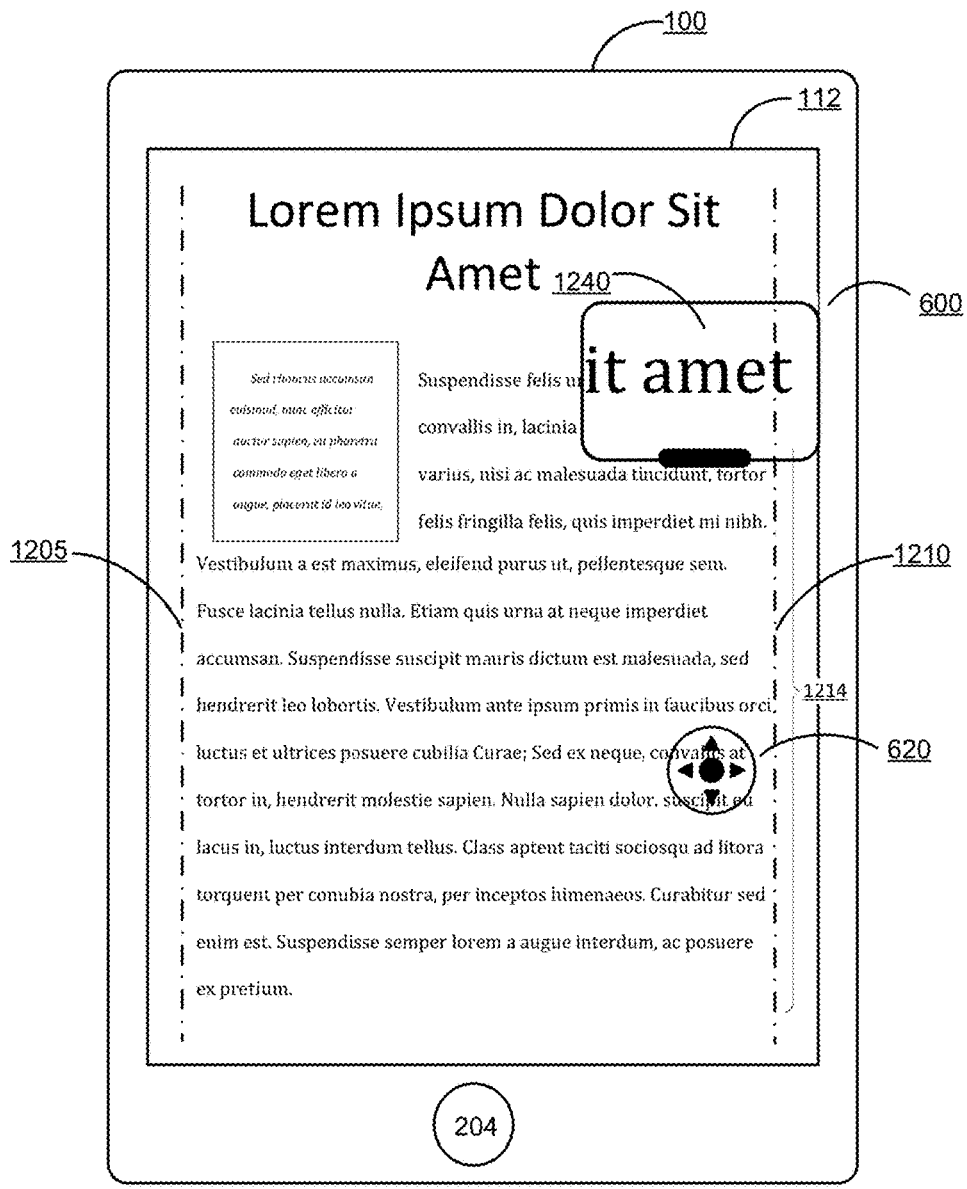

After scrolling the content in accordance with the scroll request, the device detects 1140 a predefined scroll event. As shown in FIG. 12D, in some embodiments, the predefined scroll event includes the scrolling reaching the second boundary 1210, e.g., a right boundary of the scrollable text content. The magnification region 600 is moved to a location 1240 on the user interface, at which the second boundary is displayed within the magnification region. In some embodiments, in response to detecting the predefined scroll event, the device optionally pauses the scrolling for at least a predetermined amount of time after reaching the second boundary. In some embodiments, the predefined scroll event includes detected user input such as the user lifting the finger from the display 112 after continuously contacting the display as part of a scrolling gesture detected by the device. According to some embodiments, FIG. 12E shows the user interface immediately after the contact 1220 ceases.

Figure 12F:
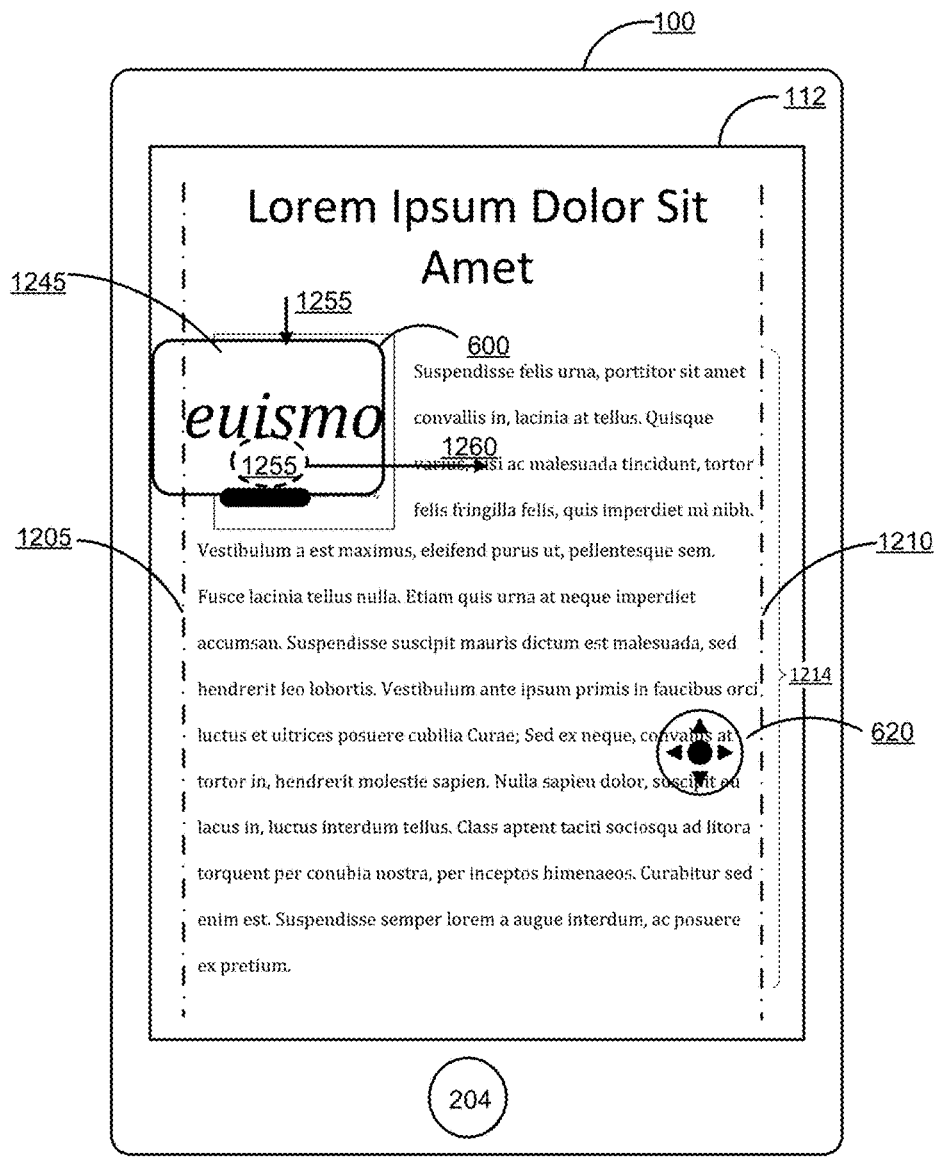

In response to detecting the predefined scroll event, the device scrolls 1150 the content so that the first boundary 1205 of the content is displayed within the magnification region 600. In some embodiments, the device further scrolls the content so that the second boundary of the content ceases to be displayed within the magnification region. As shown in FIG. 12F, in some embodiments, the device determines a new location 1245 for the displayed magnification region 600, which is shifted in a second direction 1250 by a threshold distance relative to the magnification region's original location prior to receiving a scroll request. The scrolling to the first boundary and shifting in a second direction is analogous to a "carriage return" mechanism on a typewriter. This "carriage return" mechanism, after typing a line of text, causes the carriage holding the paper to return to the right so that the typewriter can continue typing on the paper's left-hand side with the key levers typically advanced to the next line. In some embodiments, threshold distance equals the spacing of one text line and the second direction is perpendicular to first direction, e.g., vertically off-setting the text by one line. In some embodiments, the threshold distance is based on the content displayed on the user interface. For example, in conjunction with snapping back to a beginning of the content, the device advances the content downward by one line of text, one row of a spreadsheet, one row of a grid of photos, and the like. As shown FIG. 12F, in some embodiments, the scrolling of the content within the magnification region continues by detecting another scrolling gesture represented by the contact 1255 of the user's finger moving in the right direction 1260 relative to the orientation of the device.

In some embodiments, the device scrolling of the content so that the first boundary of the content is displayed within the magnification region is independent of a lateral movement of an input condition detected by the device. A lateral movement example includes the movement of a contact on the touch-sensitive display. Several heuristics and system context can also alter the auto-snap behavior of the user interface. Heuristics and system context include, for example, the current on-screen location of the user interface and/or text content, including the page size, font size, and the like. For example, the auto-snap method can detect right-to-left languages or top-down languages and adjust its scrolling behavior, accordingly.

In some embodiments, the device detects a scroll request that is not associated with the magnification region. For example, the device detects a request to move the magnification region without the auto-snap feature. Upon detecting such scroll request, the device scrolls the content within the magnification region without auto-snapping the content upon reaching the second boundary of the content. In some embodiments, upon detecting such scroll gesture, the device moves the magnification region without auto-snapping the magnification region upon reaching the second boundary of the content. In some embodiments, the auto-snap feature is activated by tapping the border of the magnification region prior to the scroll request, e.g., dragging the content with a scroll gesture within the zoom lens. An example of using the auto-snap feature of method 1100 includes the following steps: A user begins reading at the left margin of the text displayed in the zoom lens and then moves the focus of the lens to the right as he reads along the line of text. Once the focus of the lens reaches the right text margin, or the user lifts his finger from the display, the focus of the lens animates back to the left text margin so that the user can read the next line. In animating back, the device offsets the text down by one line within the zoom lens so that the focus of the lens is on the next line.

The disclosure herein has been described in particular detail with respect to some embodiments. Those of skill in the art will appreciate that other embodiments optionally are practiced. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component optionally are instead performed by multiple components, and functions performed by multiple components optionally are instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments disclosed herein include process steps and instructions described herein in the form of an algorithm. It should be noted that the process steps and instructions could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems optionally are also used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages optionally are used to implement the teachings of the present invention as described herein, and any references to specific languages are provided for invention of enablement and best mode of the present invention.

The embodiments disclosed herein are well suited to a wide variety of computer network systems over numerous topologies. Within this field, the configuration and management of large networks includes storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. A non-transitory computer-readable storage medium including instructions to perform the steps of:
   displaying a magnification region on a first portion of a user interface, wherein:
      the user interface is displayed at a first zoom level; and
      the magnification region includes a subset of the first portion of the user interface displayed at a second zoom level that is higher than the first zoom level;
   while displaying the user interface, detecting a text input condition; and
   in response to detecting the text input condition:
      concurrently displaying a composition interface window in a second portion and a third portion of the user interface, wherein the third portion of the user interface corresponds to a resized version of the magnification region, the third portion not overlapping with the second portion that includes the composition interface window.

2. The non-transitory computer readable storage medium of claim 1, wherein the magnification region comprises a zoom window or a zoom lens.

3. The non-transitory computer readable storage medium of claim 1, wherein regions of the user interface outside of the magnification region remain displayed at the first zoom level.

4. The non-transitory computer readable storage medium of claim 1, wherein the text input condition comprises a keyboard-display condition.

5. The non-transitory computer readable storage medium of claim 1, wherein the composition interface window comprises a keyboard window.

6. The non-transitory computer readable storage medium of claim 1, wherein the second portion comprises the bottom half of the display.

7. The non-transitory computer readable storage medium of claim 1, wherein the third portion comprises the top half of the display.

8. The non-transitory computer readable storage medium of claim 1, further comprising instructions to perform the steps of:
   in response to detecting the text input condition:
      optionally moving the magnification region to the third portion of the display, the resized and optionally moved magnification region not overlapping with the composition interface window.

9. The non-transitory computer readable storage medium of claim 1, wherein resizing and optionally moving the magnification region so that the magnification region and the composition interface can both be viewed and interacted with at a same time.

10. The non-transitory computer readable storage medium of claim 1, wherein the first portion of the user interface takes up the entire display, the magnification region being displayed on the first portion.

11. The non-transitory computer readable storage medium of claim 1, further comprising instructions to perform the steps of:
   in response to detecting the text input condition:
      readjusting a location of a directional pad of the magnification region so the directional pad does not overlay with composition interface window.

12. The non-transitory computer readable storage medium of claim 1, further comprising instructions to perform the steps of:
   in response to detecting the text input condition:
      in response to moving the focus to the composition interface window:
         fading out a directional pad.

13. The non-transitory computer readable storage medium of claim 1, further comprising instructions to perform the steps of:
   while displaying the composition interface window, disabling further resizing of the magnification region or optionally moving the magnification region.

14. The non-transitory computer readable storage medium of claim 1, wherein in response to detecting UI-orientation change condition, displaying the magnification region at an identical orientation relative to keyboard.

15. The non-transitory computer readable storage medium of claim 1, wherein content displayed in the magnification region changes in response to moving the magnification region around without scrolling the user interface.

16. The non-transitory computer readable storage medium of claim 1, further comprising instructions to perform the steps of:
   detecting a text enter condition at a location on the display corresponding to the composition interface window; and
   in response to detecting the text enter condition, displaying entered text in the magnification region.

17. The non-transitory computer readable storage medium of claim 1, further comprising instructions to perform the steps of:
   prior to displaying the magnification region, displaying a user interface on the display at the first zoom level; and
   while displaying the user interface on the display at the first zoom level, receiving a magnification request;
   wherein the magnification region is displayed in response to receiving the magnification request.

18. A method comprising:
   at an electronic device with a touch-sensitive display:
      displaying a magnification region on a first portion of a user interface, wherein:
         the user interface is displayed at a first zoom level; and
         the magnification region includes a subset of the first portion of the user interface displayed at a second zoom level that is higher than the first zoom level;
      while displaying the user interface, detecting a text input condition; and
      in response to detecting the text input condition:
         concurrently displaying a composition interface window in a second portion and a third portion of the user interface, wherein the third portion of the user interface corresponds to a resized version of the magnification region, the third portion not overlapping with the second portion that includes the composition interface window.

19. A system comprising an electronic device with a display and one or more input devices a non-transitory computer readable storage medium, and a processor, wherein the non-transitory computer readable storage medium includes instructions causing the processor to perform the steps of:
   displaying a magnification region on a first portion of a user interface, wherein:
      the user interface is displayed at a first zoom level; and
      the magnification region includes a subset of the first portion of the user interface displayed at a second zoom level that is higher than the first zoom level;
   while displaying the user interface, detecting a text input condition; and in response to detecting the text input condition:
concurrently displaying a composition interface window in a second portion and a third portion of the user interface, wherein the third portion of the user interface corresponds to a resized version of the magnification region, the third portion not overlapping with the second portion that includes the composition interface window.

20. The non-transitory computer-readable storage medium of claim 1, wherein the magnification region occupies a first amount of the display, and wherein the resized version of the magnification region occupies a second amount of the display that is greater than the first amount of the display occupied by the magnification region before detecting the text input condition.

* * * * *